US010038695B2

(12) United States Patent
Goldfarb et al.

(10) Patent No.: US 10,038,695 B2
(45) Date of Patent: Jul. 31, 2018

(54) REMOTELY DEAUTHENTICATING A USER FROM A WEB-BASED APPLICATION USING A CENTRALIZED LOGIN SERVER

(71) Applicant: ALTR Solutions, Inc., Satellite Beach, FL (US)

(72) Inventors: Scott Nathaniel Goldfarb, Washington, MI (US); James Douglas Beecham, Mill Valley, CA (US)

(73) Assignee: ALTR Solutions, Inc., Satellite Beach, FL (US)

(*) Notice: Subject to any disclaimer, the term of this patent is extended or adjusted under 35 U.S.C. 154(b) by 0 days.

(21) Appl. No.: 15/675,445

(22) Filed: Aug. 11, 2017

(65) Prior Publication Data

US 2017/0366547 A1    Dec. 21, 2017

Related U.S. Application Data

(63) Continuation-in-part of application No. 15/171,347, filed on Jun. 2, 2016.

(60) Provisional application No. 62/374,327, filed on Aug. 12, 2016, provisional application No. 62/169,823, filed on Jun. 2, 2015.

(51) Int. Cl.
*G06F 15/16* (2006.01)
*H04L 29/06* (2006.01)
*H04L 29/08* (2006.01)
*G06F 3/0481* (2013.01)

(52) U.S. Cl.
CPC ............ *H04L 63/10* (2013.01); *H04L 63/083* (2013.01); *H04L 63/102* (2013.01); *H04L 63/20* (2013.01); *G06F 3/0481* (2013.01); *H04L 67/02* (2013.01); *H04L 2463/082* (2013.01)

(58) Field of Classification Search
CPC ....... H04L 63/083; H04L 67/14; G06F 21/41; H04W 4/60; G06Q 20/3821
See application file for complete search history.

(56) References Cited

U.S. PATENT DOCUMENTS

| 6,848,000 B1* | 1/2005 | Reynolds | H04L 29/06 709/203 |
| 2002/0184496 A1* | 12/2002 | Mitchell | G06Q 20/3821 713/168 |
| 2012/0144024 A1* | 6/2012 | Lee | G06F 21/41 709/224 |

(Continued)

OTHER PUBLICATIONS

Agile Testing: Web app testing with Python part 2: Selenium and Twisted, http://agiletesting.blogspot.com/2005/03/webapptestingwithpythonpart2.html, Mar. 3, 2005, pp. 1 to 20.

(Continued)

*Primary Examiner* — Vivek Srivastava
*Assistant Examiner* — Muhammad Raza
(74) *Attorney, Agent, or Firm* — Pillsbury Winthrop Shaw Pittman LLP

(57) ABSTRACT

Provided is a process including: relaying, with a server at a first domain, at least part of a plurality application-layer messages between a client web browser and one or more destination servers; determining to terminate subsequent authenticated access by the client web browser; and sending, from the server at the first domain, instructions that cause the client web browser to delete or modify an access token stored in memory of the client web browser.

28 Claims, 8 Drawing Sheets

(56) References Cited

U.S. PATENT DOCUMENTS

| | | | |
|---|---|---|---|
| 2015/0350338 A1* | 12/2015 | Barnett | H04L 67/143 709/203 |
| 2016/0205108 A1 | 7/2016 | Si et al. | |
| 2016/0212116 A1 | 7/2016 | Becker et al. | |
| 2016/0219038 A1 | 7/2016 | Stephenson et al. | |
| 2016/0328794 A1* | 11/2016 | Schrump | G06Q 40/02 |

OTHER PUBLICATIONS

Credential Manager Where Windows Stores Passwords & Login Details, http://www.digitalcitizen.life/credentialmanagerwherewindowsstorespasswordsotherlogindetails, Feb. 8, 2012, pp. 1 to 10.

Java How to enter password using Selenium webdriver if the password style is display:none, http://stackoverflow.com/questions/28176498/howtoenterpasswordusingseleniumwebdriverifthepasswordstyleisdisplay, May 31, 2015, pp. 1 to 3.

Man-in-the-middle attack, Wikipedia, https://en.wikipedia.org/wiki/Maninthemiddle_attack, Aug. 3, 2016, pp. 1 to 6.

OAuth, Wikipedia, https://en.wikipedia.org/wiki/OAuth, Jul. 20, 2016, pp. 1 to 8.

Passwords are Obsolete, https://medium.com/@ninjudd/passwordsareobsolete9ed56d483eb#.55ppz05fx, Apr. 12, 2014, pp. 1 to 7.

Preemptive basic authentication with Selenium, https://supermaninthemiddle.wordpress.com/2012/01/02/preemptivebasicauthenticationwithselenium/, Feb. 1, 2012, pp. 1 to 2.

Passwordless authentication: Secure, simple, and fast to deploy, https://hacks.mozilla.org/2014/10/passwordlessauthenticationsecuresimpleandfasttodeploy/, Oct. 15, 2014, pp. 1 to 23.

Using Passwordless SMS & Email Authentication with Auth0, https://auth0.com/docs/connections/passwordless, Aug. 8, 2016, pp. 1 to 10.

\* cited by examiner

REMOTELY DEAUTHENTICATING A USER FROM A WEB-BASED APPLICATION USING A CENTRALIZED LOGIN SERVER

CROSS-REFERENCE TO RELATED APPLICATIONS

This patent claims the benefit of U.S. Provisional Patent Application 62/374,327, titled REMOTELY DEAUTHENTICATING A USER FROM A WEB-BASED APPLICATION USING A CENTRALIZED LOGIN SERVER, filed 12 Aug. 2016; and the present patent is a continuation-in-part of U.S. patent application Ser. No. 15/171,347, titled COMPUTER SECURITY AND USAGE-ANALYSIS SYSTEM, filed 2 Jun. 2016, which claims the benefit of U.S. Provisional Patent Application 62/169,823, filed 2 Jun. 2015. The entire content of each of these earlier-filed applications, and content incorporated by reference therein, is hereby incorporated by reference for all purposes.

BACKGROUND

1. Field

The present disclosure relates generally to cybersecurity and, more specifically, to credential management.

2. Description of the Related Art

Often entities, like businesses, governments, and other organizations, provide access for their members (e.g., employees) to various remote applications, like web-based software-as-a-service (SaaS) applications, and native (locally executed outside of a thin client) applications. For instance, users may access various on-premises or SaaS web-based application, like online email, calendaring, office productivity, enterprise-resource planning, customer relationship management, project management, or other applications. In many cases, sensitive company information is maintained in such applications.

SUMMARY

The following is a non-exhaustive listing of some aspects of the present techniques. These and other aspects are described in the following disclosure.

Some aspects include a process, including: relaying, with a server at a first domain, at least part of a plurality application-layer messages between a client web browser executing on a client computing device and one or more destination servers at a second domain, wherein: at least some of the destination servers host content by which a user accesses resources via the client web browser; inbound messages, among the plurality of messages, include content by which a user interface is rendered in a web page on the client web browser; memory of the client web browser stores an access token provided by at least one of the destination servers; outbound messages, among the plurality of messages, include requests for content to at least some of the destination servers from the client web browser executing on the client computing device; at least some of the outbound messages include a value that demonstrates possession of the access token to at least some of the destination servers; and the first domain is defined by an identifier of an application-layer protocol, an identifier of a network host, and an identifier of a port of the server with which the server at the first domain communicates with the client web browser; determining, with one or more processors, to terminate subsequent authenticated access by the client web browser to at least some of the one or more destination servers; sending, from the server at the first domain, after the client web browser obtains the access token, instructions that cause the client web browser to delete or modify the access token stored in memory of the client web browser such that the access token ceases to be effective to demonstrate that the client web browser is authenticated to at least some of the one or more destination servers, wherein: the client web browser implements a same origin policy that prohibits content from one domain from modifying values stored in browser memory by content from another domain; and the access token is obtained from at least some of the one or more destination servers after authenticating the client web browser to at least some of the one or more destination servers.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
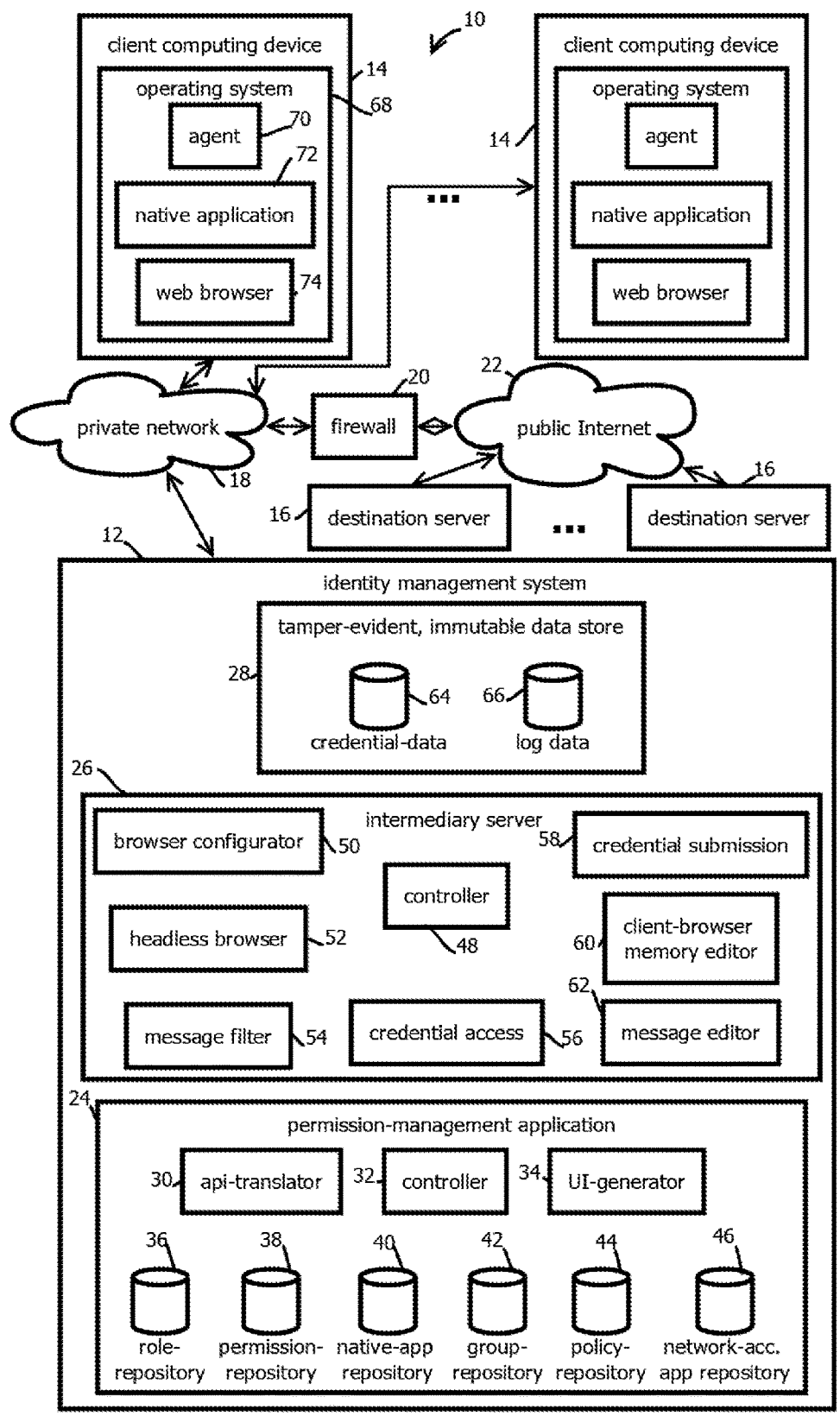
FIG. 1 is a combined logical and physical architecture block diagram that shows an example of a computing environment in which an identity management application in accordance with some embodiments of the present techniques may operate.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of cybersecurity. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

A variety of problems relating to permission management are addressed by various versions of techniques described below. These different techniques can be used together, synergistically in some cases, so their descriptions are grouped into a single description that will be filed in multiple patent applications with different claim sets targeting the different techniques and combinations thereof. In view of this approach, it should be emphasized that the techniques are also independently useful and may be deployed in isolation from one another or in any permutation combining the different subsets of techniques, none of which to suggest that any other description herein is limiting. Conceptually related groups of these techniques are preceded by headings below. These headings should not be read as suggesting that the subject matter underneath different headings may not be combined, that every embodiment described under the heading has all of the features of the heading, or that every feature under a given heading must be present in an embodiment consistent with the corresponding conceptually related group of techniques, again which is not to suggest that any other description is limiting.

These techniques are best understood in view of an example computing environment 10 shown in FIG. 1, which shows an example of a computing environment 10 in which these techniques, either individually or together, may be implemented. In some embodiments, the components of FIG. 1 are implemented with a plurality of the computing devices described below with reference to FIG. 8 to execute the operations described in FIGS. 2-5, in some cases responsive to the user interface in FIG. 6, and in some cases on the data structure of FIG. 7.

In some embodiments, the computing environment 10 includes an identity management system 12 configured to exercise control over permissions granted to users to access various native applications or network-accessible applications, such as web applications, like SaaS applications or applications on a private cloud. In some embodiments, as described in greater detail below, the identity management system 12 may be configured to store access credentials in a relatively secure tamper-evident, immutable data store. Further, some embodiments may be configured to log management and access events in a tamper-evident, immutable data store. These data stores may deter threat actors, and including otherwise trusted internal actors, from engaging in malicious behavior, due to the challenge of accessing credentials in these data repositories and due to likely inevitable discovery of the behavior in virtue of the immutably logged events. That said, embodiments are not limited to systems that afford these benefits, and some embodiments may use traditional data stores for storing this information, which is not to suggest that any other description herein is limiting.

In some embodiments, the identity management system 12 manages user's ability to access these resources on a plurality of computing devices 14, in some cases via a private network 18 separated by a firewall 20 from the public Internet 22. In some embodiments, some of the network-accessible applications may be hosted by one or more third party destination servers 16, which may include distributed web applications, in some cases with some servers managing authentication and authorization, and other servers providing services, for example, web content by which the services are delivered, and which is rendered by client computing devices in thin client user interfaces, like web pages.

In some embodiments, the private network 18 is a corporate network or network of an organization, for example, on a private subnet Internet Protocol network. In some embodiments, the private network 18 includes encrypted connections between client computing devices 14 and various internal servers. In some embodiments, the client computing devices 14 are end-user computing devices, or in some cases the client computing devices are servers executing one or more applications, such as monolithic applications or services of distributed service-oriented architecture applications, for example, in an on-premises installation by which other end user computing devices of an organization access resources via network 18. In some embodiments, the private network 18 hosts a virtual private network. In some embodiments, the identity management system 12 is on the private network 18, or in some cases the identity management system 12 may be accessed via the public Internet 22, which is not to suggest that a virtual private network may not span the public Internet 22.

In some embodiments, the illustrated components may be distributed geographically, for example, with various components more than 100 or 1000 km apart, for example, distributed over United States, North America, or the world. In the illustrated embodiment, two client computing devices 14 are illustrated, but commercial embodiments are expected to include substantially more, for example, more than 100, more than 1000, or more than 10,000 client computing devices for a given organization having an account by which the identity management system 12 is used to manage permissions for the client computing devices 14. In some embodiments, multiple tenants may share the identity management system 12, for example, in a SaaS delivery model, for instance, more than 5, more than 50, or more than 500 different tenants, in some cases with concurrent sessions. Or in some cases, the identity management system 12 may be deployed in on-premises installation or in a virtual private cloud in which an instance is deployed for an individual tenant.

Two destination servers 16 are illustrated, but commercial embodiments are again expected to include substantially more, for example, more than 20, more than 50, or more than 500 different destination servers. The term "destination" is used to refer to an external place where various resources are accessed and serves to distinguish "intermediary" servers described below, through which some exchanges with a destination server may take place. In some embodiments notwithstanding the singular term "server," the destination servers 16 may each be multi-service applications, such as distributed applications having a plurality of computing devices, such as multiple servers deployed behind load balancers and providing various services by which requests are serviced and a web application or other application program interface is exposed for use by client computing devices 14. In some embodiments, the destination servers 16 may be controlled by a third party that is different from an organization, such as a company, for which permissions are managed for members of the organization, such as users, by the identity management system 12. In some embodiments, the different destination servers 16 may support, and in some cases require, that access to resources hosted by those servers be authorized through an authentication process. In some embodiments, authentication may include supplying a user name and access credential (e.g., a password or other secret string), or value demonstrating possession of the access credit credential, for example by submitting a cryptographic hash of the access credential, or a digital signature that can be verified in an asymmetric encryption protocol as having originated from a party associated with a public key, such as a public key serving as a username, or uniquely associated with username. In some embodiments, the destination servers 16 may include servers that perform authentication on behalf of other destination servers, for example, certain destination servers implementing OAuth or OAuth 2 protocol. Examples of destination servers 16 include those hosting web-based email accounts, document repositories, chat applications, web-based office suite applications, web-based enterprise resource management applications, web-based human resources management applications, web-based customer relationship management applications, and the like. In some embodiments, these different destination servers may have different application program interfaces by which permission attributes of user accounts are managed and by which users are authenticated in a given session where a user requests to access resources of the respective destination server 16.

In some embodiments, the client computing devices 14 are desktop computing devices, laptop computing devices, tablet computing devices, smart phones, printers, copiers, scanners, or various Internet of things appliance is, like smart televisions, smart refrigerators, industrial controls equipment, industrial sensors, healthcare equipment, autonomous drones, self-driving vehicles, human-piloted vehicles, and the like. In some embodiments, some of the client computing devices 14 include servers by which other client computing devices access resources, such as client computing devices hosting monolithic applications accessed over a network, or client computing devices that host various services in a service-oriented architecture (e.g., a microservices architecture) distributed application by which other client computing devices access resources.

In some embodiments, the identity management system 12 includes a permission-management application 24, an intermediary server 26 (or elastically scalable set thereof), and a tamper-evident, immutable data store 28. In some embodiments, these components may cooperate to implement one or more of the processes, interfaces, and data structures described below with reference to FIGS. 2 through 7. In some embodiments, the permission-management application 24 may provide a centralized application by which users' permissions may be managed across a heterogeneous mix of native applications and network accessible applications, in some cases with a relatively intuitive drag-and-drop interface exposed to one or more administrator client computing devices, such as one of the client computing devices 14. In some embodiments, the intermediary server 26 may include functionality by which same-origin policies on web browsers on client computing devices 14 are circumvented, such that the intermediary server 26 may manage browser memory otherwise only accessible to a content from a domain that wrote to the browser memory, such as content from a domain from one of the destination servers 16, thereby, in some cases, affording a mechanism by which authenticated sessions may be terminated, even in the absence of an agent executing on a user computing device, and even before an authentication token (or other type of access token) associated with the authenticated session times out, as described in greater detail below. In some embodiments, the tamper-evident immutable data repository 28 may provide a data structure and mechanism by which access requests are securely logged and credentials, permissions, and adjustments thereto are securely documented in a manner that deters threat actors from attempting to modify these relatively sensitive records, in some cases with a data structure like that described below with reference to FIG. 7.

In some embodiments, the permission-management application 24 includes an application program interface translator 30, a controller 32, a user interface generator 34, a role-repository 36, a permission repository 38, a native-application repository 40, a group-repository 42, a policy-repository 44, and a network-accessible application repository 46. In some embodiments, these repositories 36 through 46, or subsets thereof, may be stored in the tamper-evident, immutable data store 28 or in a traditional data store, such as a relational database or a noSQL database. In some embodiments, the permission-management application may execute a process described in greater detail below with reference to FIG. 5, responsive to a user interface described in greater detail below with reference to FIG. 6, to afford a centralized interface by which a plurality of different native and remotely hosted applications are managed with respect to user permissions, for example, permissions specifying resources a given user with a given credential is authorized to access on the respective application.

The various repositories 36 through 46 may store data in service of these types of functionality. In some embodiments, the role-repository 36 may store records that map individual users to roles, such as a job title, for example, in a hierarchical taxonomy of job titles, and some embodiments may maintain records in the policy-repository 44 that map titles to various sets of permissions in various managed applications. In some embodiments, the permissions repository 38 may store a current mapping between users and sets of permissions in various applications, in some cases populated based on operations in which the records in the role-repository 36 are joined with records in the policy-repository 44. In some embodiments, the native-application repository 48 may store an inventory of native applications for which permissions are granted, and, in some cases, an inventory of user computing devices upon which the native applications are installed, in some cases with unique identifiers associated with each installed instance, in some cases associated with identifiers of the client computing devices, such as MAC addresses, Internet Protocol addresses, and the like. In some embodiments, the group-repository 42 may include records by which users are assigned to groups, for example, hierarchies of groups, for instance, different departments and teams within an organization. In some embodiments, records in the group-repository may be joined with rules in the policy-repository to determine which permissions are granted or revoked. For example, users within an accounting group may be granted permissions based on such a mapping in the group-repository 42 according to a rule in the policy-repository 44. In some embodiments, default permissions may be determined based on a join operation between the role-repository 36, the group-repository 42, and the policy-repository 44. In some embodiments, different policies may be associated with different tenants in the policy-repository 44 or different business units.

In some embodiments, the network-accessible application repository 46 may store application-program interface translation records, such as templates, by which permission management requests received in a uniform format from client computing devices 14 are translated into an application program interface schema specific to that of one of the destination-servers 16, for example, accommodating different schemas for adding or removing permission of different application program interfaces exposed by different third parties operating the different destination servers 16. In some embodiments, the network-accessible application repository 46 may further include records that define client-side data structures formed in web browser state in the course of rendering web content provided by different third parties operating different destination servers 16. Examples include addresses, for example, key terms in a namespace of a web application, like names of cookies, names of local-Storage objects, or primary keys in a SQLite database, populated within browser memory of a web browser on one of the client computing devices 14 responsive to commands sent by one of the destination servers 16. Examples include an identifier of a cookie storing an authentication token by which a client computing device 14 demonstrates that a given message is part of an authenticated session in a message to one of the destination servers 16.

In some embodiments, the controller 32 may coordinate the operation of the other components of the permission-management application 24, in some cases executing the process described below with reference to FIG. 5 in cooperation with these components.

In some embodiments, the application program interface translator 30 may be configured to interface with web-browser memory based on addresses in a namespace of web browser state defined by content a destination server 16 and identified with records in the network-accessible application repository 46. For example, browser memory may be accessed based on an identifier of a network-accessible application upon which operations are to be performed, for instance, translating a command to de-permission a current session in a command that causes a cookie storing an authentication token on a client web browser to be deleted or otherwise modified such that the authentication token is inoperative, or composing or otherwise selecting scripting instructions to be embedded into content sent from a destination server to a client computing device, such that the web browser of the client computing device is rendered responsive to a de-permission command from the permission-management application 24 to delete (or otherwise modify to render inoperative values within) such client-side browser memory.

Further, the application program interface translator 30 may be operative to translate permission-related management request from administrator client computing devices into commands sent to different destination servers 16 to modify permissions stored in records accessible to the destination servers 16, for example, in associated user accounts hosted by different destination servers 16.

In some embodiments, the user interface generator 34 is configured to form instructions sent to client computing devices 14, for example, webpage markup, scripting routines, and styling instructions, along with other resources, like images and structured data, by which user interfaces are rendered, for example, in web browsers. In some embodiments, the user interface generator 34 is configured to send (and process instructions from) the user interface described below with reference to FIG. 6. Or in some cases, the user-interface interface generator 34 exposes an application program interface accessed by a native application on one of the administrator client-computing devices. Sending data by which a user interface is constructed is an example of sending a user interface.

In some embodiments, the intermediary server 26 is configured to implement processes described below in greater detail with reference to FIGS. 2 through 4. In some embodiments, the intermediary server 26 includes a controller 48, a browser configurator 50, a headless browser 52, a message filter 54, a credential access module 56, a credential submission module 58, a client-browser memory editor 60, and a message editor 62. In some embodiments, multiple instances of the intermediary server 26, and in some cases the other illustrated components, may be elastically scaled, for example, with various tools for orchestrating additional instances, for example, by spinning up additional containers or virtual machines and deploying images to those computational entities, or spinning down such entities as demand subsides. In some embodiments, one intermediary server 26 may be instantiated for each current session between a client computing device 14 and a destination server 16, or in some cases, different instances of the headless browser 52 may be instantiated for each instance.

In some embodiments, the controller 48 may execute the below-describe processes and coordinate the operation of the other components of the intermediary server 26. In some embodiments, the controller 48 may monitor a network socket on the private network 18 by which a client computing device 14 attempts to communicate with one of the destination servers 16, and the controller 48 may monitor another network socket (which may be specified by an IP address and port number), either on the private network 18 or the public Internet 22, by which those messages are related to the destination server 16, in some cases, with modifications like those described below.

In some embodiments, the browser configurator 50 may be operative to configure the headless browser 52, for example, upon instantiating or repurposing a given instance of the headless browser 52. In some embodiments, the browser configurator 50 may obtain, either from memory or by parsing hypertext transport protocol requests or otherwise interrogating a web browser on a client computing device 14, a browser fingerprint, which in some cases may include attributes of the computing device executing the browser. In some embodiments, the browser configurator 50 may receive a browser fingerprint by parsing a user-agent string from a web browser, for example, in a header of a hypertext transport protocol request sent to the intermediary server 26 from a web browser executing on a client computing device 14. In some cases, the user-agent string may identify a web browser, a version of the web browser, an operating system, a version of the operating system, a window size, a display size, a processor, an amount of memory, whether the user interface is touch-enabled, and the like. In some embodiments, the browser configurator 50 may be configured to form an instance of a headless browser 52 that has some or all of these attributes, for example, with a matching or partially overlapping subset of fields within a user agent string of the headless browser 52. In some embodiments, this may cause content negotiation implemented with the headless browser 52 to yield web-based content that will render properly when relayed to a web browser on a client computing device 14.

In some embodiments, the headless browser 52 may be a headless browser configured to render webpage content, thereby forming a document object model or virtual document object model in browser state. Or in some embodiments, the browser 52 is not headless and causes a display to be presented. In some embodiments, the headless browser is further configured to execute scripting language instructions, such as JavaScript™ or WebAssembly in received web content, which in some cases may include modifying a document object model, a virtual document object model, or records in local storage of a browser, for instance within cookies, localStorage objects, or SQLite databases in client-side web page state of a browser. In some embodiments, modifying local storage may include writing cookies or other instances of these types of storage, deleting records, or modifying records, and some embodiments may be configured for reading records. In some embodiments, the headless browser 52 may be instantiated with a webdriver object, for example, provided by the Selenium™ headless web browser.

In some embodiments, the headless browser 52, like browsers on the client computing devices 14, may implement a same-origin policy. As a result, in some cases, the browser may prohibit content from one domain from accessing local storage of the web browser written by content from another domain. The same-origin policy is a technique by which security is enforced across websites and which, for example, prevents content from a malicious website from reading values written to cookies by, for example, an email website or a banking website and obtaining information like access tokens or passwords by which a sensitive account might be compromised. As noted above, the web browser 74 described below implements a same origin policy, for instance, as defined in RFC 6454.

In some embodiments, the intermediary server 26 may include a message filter 54 configured to classify messages sent between the client computing device 14 and a destination server 16 as pertaining to permission information managed by the permission-management application, for instance, via the intermediary server 26. Examples include messages pertaining to authentication protocols. For instance, in some embodiments, the message filter 46 may classify requests from client computing devices or content from destination servers 16 as pertaining to a user interface by which a user logs into a service hosted by one of the destination server 16, for instance, a webpage user interface by which a user submits a username and password or other value demonstrating possession of the password, such as a cryptographic hash of the password formed client-side. Some embodiments may be configured to detect messages from a destination server 16 containing such a user interface, in some cases based on records in the network-accessible application repository by which filters are configured for a given destination server 16 or corresponding application hosted on that destination server 16. Examples include regular expressions configured to detect keywords in web content, such as hypertext markup, scripting languages, styling, or resources like images, known to be present within such interfaces.

In some embodiments, the headless browser 52 may maintain a secure encrypted connection between the headless browser 52 and one of the destination servers 16, for example, an SSL or TLS connected session over HTTPs. In some embodiments, the headless browser 52 may decrypt content received from the destination server 16 according to these protocols and encrypt messages sent to these servers according to these protocols. Upon decrypting, though, aspects of webpage state in the headless browser 52 may be accessible to the controller 48 in order to give effect to some of the processes described below, in some embodiments.

In some embodiments, the credential access module 56 may be configured to retrieve credentials from the credential repository 62 in the tamper-evident, immutable data store 28, for example, by querying the data structure described below with reference to FIG. 7. In some embodiments, as described in greater detail below, credentials to access a given destination server 16 may be withheld from client computing devices 14, for instance, preventing users or web browsers on client computing devices from accessing passwords by which sessions are authenticated with various third-party web applications.

In some embodiments, the credential submission module 58 is configured to log users into authenticated interactions with the destination servers 16, such as into authenticated sessions. In some embodiments, upon the message filter 54 classifying received content as being a user interface by which a user logs in, some embodiments of the credential submission module 58 may programmatically (which is not to suggest that other operations are not programmatic, as all operations not designated as human performed herein should be read as programmatic, e.g., automatic) populate inputs of the user interface, for example, text box inputs with credentials, and in some cases, user names. In some embodiments, the network-accessible application repository 46 may further maintain instructions by which a document object model or virtual document object model encoding the logging user interface is traversed or otherwise parsed to identify and map webpage elements to fields submitted during a login, for example, identifying a document object model element corresponding to a text box input by which a user name is submitted and another text box input by which a password, or value demonstrating possession of the password, is submitted. Some embodiments may parse the document object model to identify these inputs and programmatically insert passwords, and in some cases, user names corresponding to a given user for which accessories requested. In some cases, the user interface is not sent to the client computing device 14, or in some cases a subset of the user interface is sent to the client computing device, for example, a subset formed by omitting or otherwise modifying a field by which a password is input, while permitting the users supply a username. In some embodiments, user interface elements by which a captcha is presented or by which a second factor in two-factor authentication is entered is passed through to the client computing device 14, and some embodiments may then relay a response from the user, or update a mirror of a web browser state in the headless browser 52 based on user responses return to the intermediary server 26 in accordance with the techniques described below.

In some embodiments, the client-browser memory editor 60 is configured to modify records in a web browser executing on a client computing device 14 and, in some cases, local browser memory records mirrored in the headless browser 52. In some embodiments, the client-browser memory editor 60 may be configured to access records at addresses specified with records in the network-accessible application repository 46 corresponding to an application being accessed to, for example, insert in browser memory, such as a cookie, an authentication token received by the headless browser 52 in a secure encrypted exchange with one of the destination servers 16, upon a successful submission of a credential by the module 58, thereby rendering the instance of the web browser mirrored on a client computing device 14 authenticated to engage in subsequent messaging with the destination server 16.

In some embodiments, authenticated messages may have the authentication token, or a value demonstrating possession of the authentication token, such as a value that is a cryptographic hash of the authentication token, or a value digitally signed with an asymmetric encryption protocol, by the authentication token, appended to messages. Destination servers 16 may parse the value demonstrating possession of the authentication token from messages received from the client computing devices 14, for example, via the intermediary server 26, and determine whether the value correctly demonstrates possession of the authentication token and thereby determine, in response to the value correctly demonstrating possession, that the message is authenticated by a party that was authorized via the credential submission from the module 58.

In another example, the client-browser memory editor 60 may be configured to delete or otherwise modify such records to remove the ability of a client computing device web browser to send authenticated messages under a current authenticated session in accordance with the techniques described in greater detail below with reference to FIG. 4. In some embodiments, this technique may be implemented without implementing the techniques by which access credentials are withheld from users or client computing devices 14. For example, some embodiments may permit the user to supply the password, while still retaining the ability to terminate an authenticated session without waiting for the access token to expire, which is not to suggest that any other feature described herein is required in all embodiments.

In some embodiments, the message editor 62 may be configured to edit messages sent between the client computing device 14, such as a web browser executing on the client computing device 14, and one or more of the destination servers 16. In some cases, this may include editing fields in headers of various protocols by which data is exchanged. Some embodiments may be configured to modify origin host fields in an application layer protocol, such as a hypertext transport protocol, header (which includes secure variants thereof and other transport protocols, like SPDY). In some cases, modifying origin host fields may include composing new headers with the same content or copies thereof, or in some cases extant copies may be modified, for example by overwriting values in various fields. In some embodiments, the host origin field may be accompanied with or other origin parameters, such as a protocol identifier and a port number of a computational entity from which a given message originated. In some embodiments, modifying may include modifying the host origin field to identify the intermediary server 26 as a host, rather than a destination server 16 as host. In some embodiments, this may include forming a version of an application-layer message in which the host origin field includes a uniform resource identifier of the intermediary server 26, such as one mapped to the intermediary server 26 by a domain name service the client computing device 14 web browser is configured to access to resolve uniform resource identifiers into Internet Protocol addresses. In some embodiments, a URI of the destination server 16 may be replaced in the modified version (which may be a new copy formed that never includes the URI of the destination server) with a URI of the identity management system intermediary server 26. As a result, in some embodiments, the intermediary server 26 may be able to access web browser memory on the client computing device written to by content from the destination server 16 without being blocked by a same-origin policy implemented by the web browser on the client computing device 14.

In some embodiments, other techniques for circumventing the same-origin policy may be implemented. In some embodiments, the client computing device 14 may be configured to access a private domain name service controlled by the permission-management application 24 to resolve Internet Protocol addresses from uniform resource identifiers, such as uniform resource locators. In some embodiments, the permission-management application 24 may be configured to modify a mapping between Internet Protocol addresses responsive to a determination that web browser memory needs to be remotely accessed, such that an Internet Protocol address and port number of a network socket of their intermediary server 26 is mapped to a uniform resource identifier formerly mapped to a corresponding destination server 16.

In some embodiments, the message editor 62 may append authentication tokens, or values demonstrating possession of authentication tokens, to messages from client computing devices to destination servers 16, without the authentication token being provided to client computing device's web browser memory, thereby permitting selective management of authenticated messages at the intermediary server 26, without needing to access the authentication token in web browser memory in some cases.

Or some embodiments may only manage native applications and not manage network-accessible applications, or some embodiments may manage native applications and server-side user account settings, without exercising control of ongoing currently authenticated sessions, which is not to suggest that any other feature described herein is limiting.

In some embodiments, the tamper-evident immutable data store 28 may implement the techniques described in a patent application titled IMMUTABLE DATASTORE FOR LOW-LATENCY READING AND WRITING OF LARGE DATA SETS, filed on the same day as this application, the contents of which are hereby incorporated by reference. In some embodiments, this may include storing credentials and logged access and permission events in the data structure described below with reference to FIG. 7, in some cases in replicated instances of that data structure, and in some cases with different instances of that data structure for credential data and for log data.

In some embodiments, each of the client computing devices 14 may execute an operating system 68 in which an agent 70, a native application 72, and a web browser 74 may execute. In some embodiments, the web browser 74 may be characterized as a thin client application by which the destination servers resources 16 are accessed.

In some embodiments, the operating system is Windows™, Mac OS™, z/OS™, iOS™, Android™, or another version of Linux™. In some embodiments, the agent 70 is configured to launch upon booting of the operating system 68. In some embodiments, the agent 70 establishes a persistent connection with the permission-management application 24 upon being launched, for example, periodically polling the permission-management application 24, or connecting to a network socket of the client computing device 14, via a network stack of the operating system 68, and sending a message to the permission-management application 24 upon launching identifying the Internet protocol address and port number of the network socket, such that the agent 70 may receive messages from the permission-management application 24 in real time via a continuous connection. In some embodiments, the agent 70 may be configured to execute operations described in greater detail below with reference to FIG. 3 by which the native application 72 is controlled. In some embodiments, the agent 70 may include a secure region of memory in which access credentials for the native application 72 are stored. In some embodiments, the secure region of memory may be encrypted, and in some cases a key to decrypt the secure region of memory may be stored within a secure element or other hard-ware segregated region of protected memory of the client computing device 14. Thus, in some cases, the agent 70 may be operative to permit access to the native application 72, by detecting that the native application 72 is being launched, and decrypting and accessing the access credential, even in the absence of network access. Or in some embodiments, the access credential for the native application 72 may instead be stored in the credential data repository 64 and accessed via networks to provide enhanced security.

In some embodiments, the native application 72 is a desktop application executing on desktop or laptop computer or a native application executing on a mobile computing device, like a smart phone, for example, a native application downloaded from the app store of a provider of an operating system 68. Examples include email clients, office productivity suite applications, spreadsheet applications, word processing applications, computer aided design applications, and the like. In some embodiments, the web browser 74 is also under the control of the agent 70.

Credential-Free User Login to Remotely Executed Applications

Often business employees access web-based or native applications where credentials need to be shared amongst multiple individuals within an organization. For instance, a group of users may share a login username and password for an account to some SaaS web-based application, like online email, calendaring, office productivity, enterprise-resource planning, customer relationship management, project management, or other applications. In many cases, sensitive company information is maintained in such applications.

Yet employees often fail to adequately protect login credentials. Many leaks are due to human failings. It is common for employees to write down the credentials on a notepad visible on their desk, potentially exposing the sensitive information to anyone walking through an office. Or in many cases, employees choose simple passwords that are easy to brute force. Some threats are intentional. Threat actors often engage in relatively sophisticated spear phishing campaigns by which employees are tricked into revealing their login credentials. Keyloggers on employee computers represent yet another attack vector. And in many cases, begrudged employees intentionally abuse and disclose login credentials, e.g., selling such credentials on the dark web.

Some embodiments include a system designed to be used by business employees where they are required to access web-based or native applications where credentials might otherwise need to be shared amongst multiple individuals within an organization. With some embodiments of this system, the user never has knowledge of their credentials and therefore cannot share them and furthermore allows the password to be much more complicated than a human would create, and also allows the password to be changed much more frequently than a human would tolerate.

Web-based authentication: In some embodiments, a centralized login server is used to authenticate users to web-based applications. The user's machine may have the same outbound IP Address as the centralized login server (in WAN environments, VPNs may be used to satisfy this requirement).

When a login request is generated by the user, in some embodiments, the current browser settings, including user-agent, current cookies for the requested domain, and other related browser characteristics, may be sent to the centralized login server. The centralized login server may then create a software browser and load the user settings so that the software browser mimics the user's browser. The software browser on the centralized login server may then attempt to access the homepage of the requested domain. If the user is already authenticated to the site, the centralized login server returns with the updated cookie settings to the client machine, where the cookies are automatically placed into the browser and the homepage for the domain is loaded into the browser, thereby logging the user in. In some cases, the administrators of the system may request a log out and re-login if the user is already authenticated to the web site for additional security.

If the software browser on the centralized login server detects the user is not authenticated to the domain, in some embodiments, the software browser looks up the user's credentials in the decentralized scatter password archive, navigates to the login screen using JavaScript or other browser interfaces, and inputs the login credentials to the domain's login screen.

If the domain requires additional login steps (e.g., two-factor authentication, or a captcha), in some embodiments, the centralized login server passes this information back to the client's machine via a socket established to the client's browser and requests the user to complete the action on behalf of the centralized login server. The user's completed additional login step, in some embodiments, is then sent back to the centralized login server via the socket from the user's browser, which then allows the centralized login server software browser to input those same user settings into the domain's additional login step page.

If there is no additional login step, or the user has completed the additional login steps, in some embodiments, the software browser on the centralized login server waits for the homepage to load, then returns the newly generated cookies back to the client's machine where they are loaded into the client's browser and the homepage for that domain is loaded as well. The user is now logged into that web application.

Many existing password managers expose the password to the user or break TLS encryption (e.g., with a universal self-signed certificate authority permitting man-in-the middle packet inspection and manipulation). These systems increase the attack surface, either through the human user or through exploitation of the universal self-signed certificate authority. In contrast, some embodiments (but not necessarily all embodiments) insert the user credentials at a remote computing device (e.g., the centralized server), without exposing the credentials to the user, and without breaking TLS encryption.

This, in some embodiments, is achieved while supporting features of modern browsers, e.g., cookies and other client-side storage. In many cases, the centralized server executes a session-specific instance of a shadow web browser (e.g., the Selenium browser) operation to execute JavaScript™ so as to construct web pages formed dynamically client side. In many cases, the web content (e.g., HTML, CSS, and JavaScript™) sent to the client passes through this server-side browser, and the content is rendered in two places, on the client and at the server. The difference being that the server may insert the credentials in the version executing server side and submit those credentials. HTTP transmissions may be modified server-side to spoof those coming from the client device. Thus, two instances of a browser may render the webpage (one on the intermediate centralized server and one on the client device), the instance on the server may insert the credentials, and the operation may be transparent to the remote host of the content, avoiding the need to re-design the traditional client-server architecture upon which most of the web is built.

In some embodiments, the centralized server and the client device exist on a secure private network, and information sent therebetween may be independently encrypted, e.g., with another form of encryption that is reapplied, such as via a virtual private network or another TLS or SSL session operated in parallel with that of the destination server intermediary server.

Native application authentication: In the case of native applications, in some embodiments, a helper application with a GUI component (tray/menu icon) can be used to request login credentials from the centralized login server's decentralized (or scattered) password archive for a specific application when prompted for a login. These credentials, in some embodiments, are then stored in a protected/sandboxed area in memory and human input (keyboard/mouse) is blocked from the user. The helper application, in some embodiments, will then locate the appropriate login window, identify relevant fields (username/password), and mimic keystrokes to appropriately complete and submit the inputs. Lastly, in some embodiments, human input is unblocked from the user and at this time the user is authenticated to the application.

In some embodiments, credentials may be stored by the centralized server by scattering the data among multiple blockchains, and some embodiments may store a resultant TXID (or unique identifier of a record in the more secure data store) in its place in a relational database (or other conventional, less secure database). In some cases, the blockchains are permissioned blockchains, which in some cases, may not implement proof-of-work on participating nodes, or some embodiments may be non-permissioned blockchains.

Figure 2:
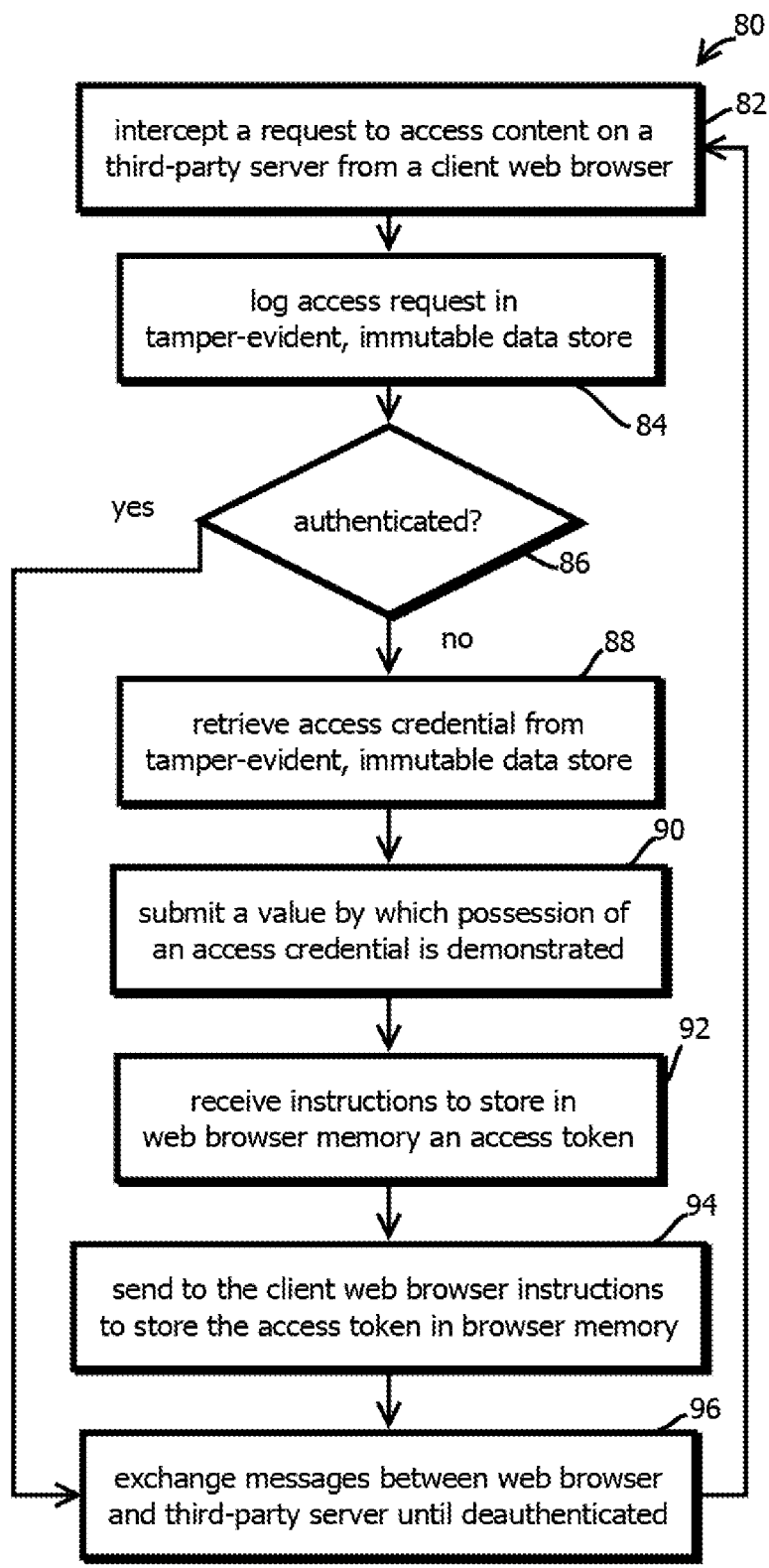
FIG. 2 is a flowchart that shows an example of a process by which client web browsers may be logged into third-party web applications without making access credentials available to users or the client web browsers in accordance with some embodiments of the present techniques.

FIG. 2 shows an example of a process 80 by which some of these techniques may be implemented. In some embodiments, the process 80 may be implemented by the above-described intermediary server 26 of FIG. 1, though embodiments not limited to that implementation, which is not to suggest that any other description is limiting. In some embodiments, the functionality of the process 80 and the other processes and functionality described herein, may be implemented with tangible, non-transitory, machine-readable media storing instructions that when executed by one or more processors effectuate the operations described by those instructions. In some embodiments, notwithstanding the use of the singular to "media," that media may be distributed, with different subsets of the instructions stored in memory of different computing devices that execute those different instructions to collectively give effect to the operations described. This arrangement is within the scope of the singular term "medium." In some embodiments, the operations of the process 80 and the other processes described herein may be executed in different order, operations may be omitted, operations may be repeated, operations may be performed concurrently, and the additional operations may be inserted, none of which is to suggest that any other description herein is limiting.

In some embodiments, the process 80 includes intercepting a request to access content on a third-party server from a client web browser, as indicated by block 82. In some embodiments, a client web browser may be configured with a hosts file or a custom domain name service to send requests to an intermediary server, rather than directly to a third-party web server corresponding to a URI to which the request is sent, such as a URI of one of the destination server 16 described above with reference to FIG. 1. Or in some cases, the intermediary server may operate as a gateway and may intercept domain name service requests and send responses that identify itself as the appropriate computational entity to communicate with to access resources for the third-party server for the client web browser. In some embodiments, the client web browser may execute on one of the above-described client computing devices 14. In some embodiments, the intercepted request may be a request sent directly to the intermediary server and the interception may be a conceptual interception, rather than requiring that a message addressed to some other computational entity be snooped or blocked or otherwise would have made it to the third party server. Thus, in some embodiments, an intermediary server may receive a request to access content on the third-party server, even though the intermediary a server is not the third-party server itself.

In some embodiments, the access request is a request for content by which a user interface to a network-accessible application is constructed within a web browser, for example, to access resources, such as a web application, hosted by the third-party server. In some embodiments, the access request is to a different server from that controlled by the third-party, for example an access request to an OAuth authentication server.

Next, some embodiments may log the access request in the tamper-evident, immutable data store, as indicated by block 84, such as the data store described above. In some cases, log entries may identify a user account, time, geolocation, Internet Protocol address, MAC address, and content, of access requests, for example, or other information pertaining to the client computing device 14 from which the request was received.

Next, some embodiments may determine whether the client web browser is currently authenticated to access the content. In some embodiments, this may include parsing an access token, or other value demonstrating possession of the access token, from a parameter of the request, as the client web browser, in some cases, may append such a value to requests to demonstrate that the request is authenticated. Or in some cases, the authentication determine may include accessing a corresponding access token in memory of the above-described headless browser 52 described with reference to FIG. 1, for instance, by querying a state of a cookie at an address, for example, having a key, designated by a record in the network-accessible application repository 46 of FIG. 1 that identifies where access tokens are stored in browser memory by the third-party server issue. Or the assessment may be based on detecting the third-party server sending a form by which a user logs in.

Upon determining that the client web browser is currently authenticated, for example, upon detecting such an access token in one of the afore-mentioned locations or value indicative thereof, some embodiments may proceed to exchange messages between the web browser and the third-party server until de-authenticated, as indicated by block 96, or the session is otherwise terminated. In some embodiments, this may include the above-described intermediary server decapsulating application-layer messages from encapsulation in lower-levels of a protocol stack, for example, decapsulating and reassembling application-layer messages from transport protocol, Internet Protocol, and physical-layer protocol packets or frames, reassembling the application-layer messages, and then modifying those application-layer messages (which may include forming new versions thereof that are different in some sense). In some embodiments, modifying those application higher than layer messages includes modifying hypertext transport protocol messages. Modifying these messages may include creating a new version of the message or overriding values in a received copy of a message. In some cases, the modification includes modifying fields in an application-layer header by which an origin host is identified to identify the intermediary server 26 instead of the client computing device 14 (as described with reference to FIG. 1) to the third-party server as the source of the request, rather than the client computing device 14. In some embodiments, the modified message may be re-encapsulated in the lower-layer protocols, identifying an Internet Protocol address and port number of the intermediary server 26 and headless browser 52 as a source address in some of these lower-layer protocol headers, before the modified application-layer message is transmitted as encapsulated in a resulting nested arrangement of packets and frames.

In some embodiments, exchanging messages between the web browser and third-party server may include reversing the above-described operation, by which application-layer messages, such as hypertext transport protocol request are encapsulated, assembled, modified, re-encapsulated, and sent, in the other direction, from the third-party server to the client-computing device. In this direction, the operations may be reversed such that the client-computing device perceives the intermediary server as the host of origin, rather than the third-party server. In some embodiments, the application-layer protocol with which messages are received may be different from the application-layer protocol with which messages are transmitted by the intermediary server. For example, in some cases, application-layer messages may be received from the client application in hypertext transport protocol, and those messages may be sent from the intermediary server to the third-party server in the HTTPs protocol, for example, according to a TLS or SSL encryption session established with the third-party server and the intermediary server, but not the client computing device. This switch in application-layer protocols may be reversed in the opposite direction. In some embodiments, the origin protocol field in application-layer headers may further be modified by the intermediary server to change the application protocol to identify the application-layer protocol with which the message is sent, forming another modification to application-layer protocol headers performed by the intermediary server in some cases.

In some embodiments, this exchange may continue until de-authentication occurs or a user terminates a session. In some embodiments, de-authentication may occur because an access token times out. In some embodiments, access tokens may be associated with a value that indicates when they expire, and the third-party server may cease honoring the access token upon that time lapsing. In other cases, the access token may be de-authenticated in a manner that is outside the control of the client web browser and the third-party server, for example, with operations described below with reference to FIG. 4.

Some embodiments, alternatively, may determine that the client web browser is not authenticated in the operation of block 86. In this event, some embodiments may proceed to retrieve an access credential from a tamper-evident, immutable data store, as indicated by block 88. In some embodiments, this may include accessing an access credential, such as a password or encryption key for a password, or encrypted ciphertext of a password, that has been segmented and distributed among multiple block chains, for example, in accordance with a data structure like that described below with reference to FIG. 7.

In some embodiments, the process 80 may include submitting a value by which possession of an access credential is demonstrated, as indicated by block 90. In some embodiments, this may include obtaining a user interface at an intermediary server from the third-party server configured to accept user login credentials. Or some embodiments may encode in the network-accessible application repository 46 a template by which an application program interface request is sent to the third-party server with a value by which possession of the access credential is demonstrated, for example, in a RESTful interface with the value encoded as a query string key-value pair in association with another query string key-value pair that identifies a user account. In some embodiments, the value by which possession of the access credential is demonstrated is a password. In some embodiments, the value is a cryptographic hash of a password. In some embodiments, the access credential is a private key associated with a public key in an asymmetric encryption protocol, and some embodiments may send an identifier by which the public key may be identified in association with a digital signature based on the private key, such that a receiving third-party server may verify that the digital signature was signed by a party with access to the private key associated with a public key associated with the signature.

Some embodiments may then receive instructions to store in web browser memory an access token, as indicated by block 92. In some cases, the instructions may be JavaScript™ or WebAssembly instructions executable by a web browser, for example, sent as part of web content by which a user interface is to be rendered by a client web browser. In some embodiments, the instructions include a command to write a cookie, store an access token in a local Storage object, or store an access token in a SQLite database of a web browser or other form of browser memory subject to the same-origin policy. In some embodiments, the command may be a command to store the access token in persistent browser memory, i.e., a type of browser memory that supports persistent access between browser sessions, for example, after a browser is closed on the client computing device and then reopened.

Some embodiments may then send the client web browser instructions to store the access token in browser memory, as indicated by block 94. In some embodiments, this operation may include executing the received instructions with a headless browser operated by the intermediary server, such that the access token is stored in browser memory of the intermediary server and causing the client web browser to execute the same instructions, such that web browser state is mirrored, at least in part both in the headless browser and in the web browser at the client computing device. In some embodiments, a subset of browser state, such as a subset of persistent browser state, or a subset of browser state including a document object model or virtual document object model, may be mirrored at both the client web browser to which messages are exchanged and at the headless browser, such that the headless browser may locally have access to the same information that is available at the client computing device in some cases.

In some embodiments, the process may proceed to block 96, and the access token stored in browser memory may be used to exchange messages between the web browser executing at the client computing device and the third-party server until de-authenticated. In some embodiments, these messages may be exchanged through the intermediary server described above, or in some cases, the messages may bypass the intermediary server other than when the client computing device is seeking to be authenticated, for instance, with some subsequent content from the third-party server being embedded in an i-frame in the client web browser controlled by the domain of the third-party server.

In some embodiments, the process of FIG. 2 may log a user into a third-party web service or other remote computing resource without the user or the user's computing device having access to the authentication credential or in some cases the value by which possession of the authentication credential is demonstrated. As a result, attempts to attack a network by compromising a user's computer with a keylogger and capturing a password or bribing an employee to reveal their password or spearfishing an employee with an attack that causes them to reveal their password may be ineffective in many cases, as in some embodiments, the user does not know their password and could not reveal it even if they wanted to. Further, some embodiments may be operative to afford these benefits without requiring that an agent be installed on the user computing device, as in some many cases, users access sensitive resources with computing devices that are not necessarily under the control of an IT department. And some embodiments may afford these benefits without requiring expensive re-writes of third party web applications to create other channels of control.

That said, embodiments implementing other techniques described herein may perform a traditional login operation at the client computing device, in and some cases though, continuing to route messages via the intermediary server, such that an ongoing session may be de-authenticated without waiting for an access token to expire, in accordance with the techniques described below with reference to FIG. 4.

Figure 3:
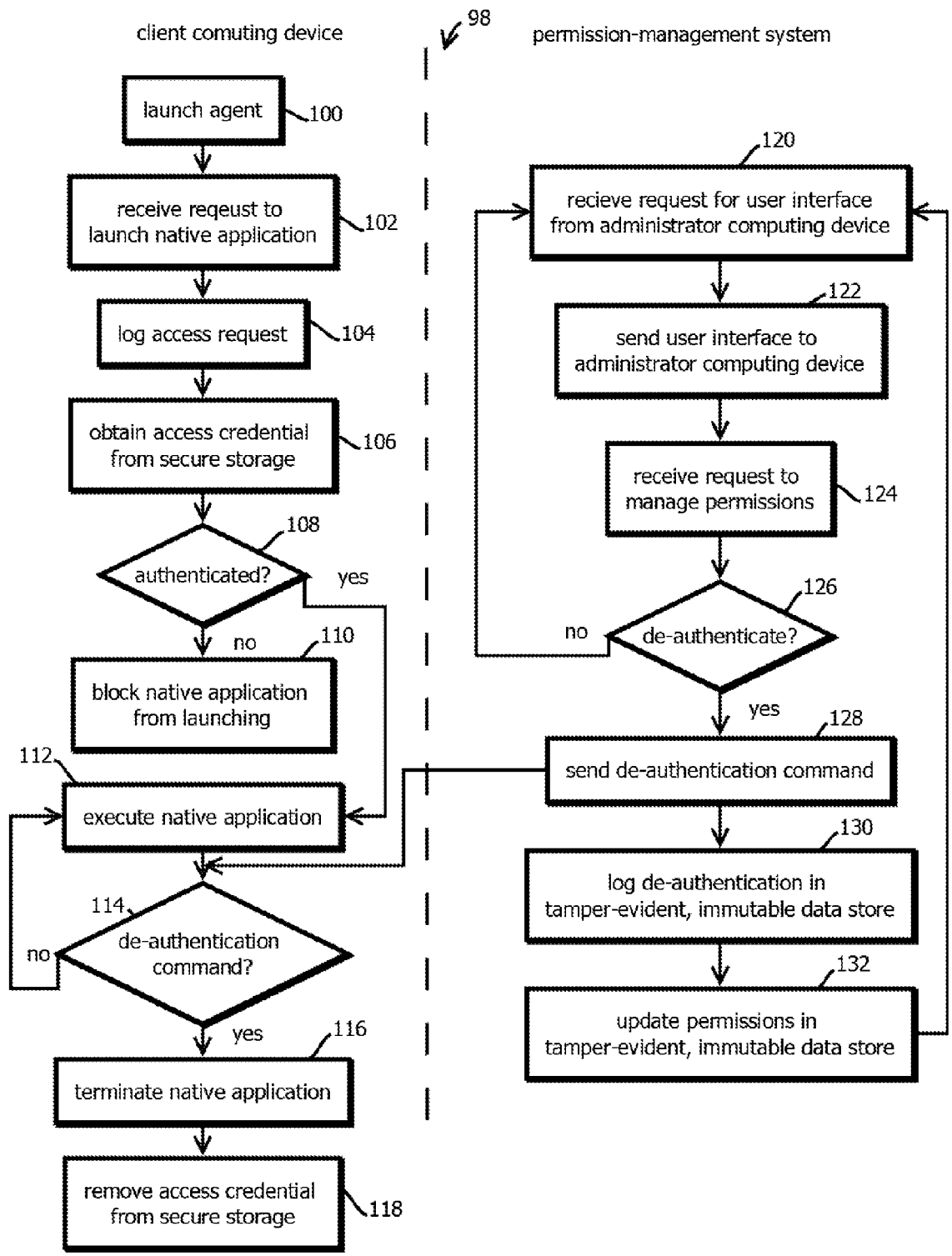
FIG. 3 is a flowchart that shows an example of a process by which permissions to access a native application executing on a client computing device may be implemented in accordance with some embodiments of the present techniques.

FIG. 3 shows an example of a process by which native applications may be accessed while withholding access credentials from users. In some embodiments, some user computing devices may execute native applications that are configured to require an access credential to operate the native application. In some cases, this may include attempting to access a file with that native application that requires the access credential, even though other files may be accessed with the same native application without the access credential.

In some embodiments, some operations of the process 98 may be executed by an agent on a client computing device, and some may be executed by permission management system, such as those described above with reference to FIG. 1, though embodiments are not limited to that implementation, which is not to suggest that any other description herein is limiting.

In some embodiments, the process 98 includes launching an agent, as indicated by block 100. In some cases, the agent may be launched automatically in the course of booting an operating system and may run in the background, for example, establishing a TCP connection to a network socket of the operating system of the client computing device and sending a message to the permission-management system that identifies the agent, the client computing device, and in some cases a user identifier of a user using the client computing device. In some cases, this message may include a port number and Internet Protocol address by which the permission-management system may send messages to the agent, which may persistently monitor the network socket.

Some embodiments may then receive a request to launch a native application, as indicated by block 102. In some embodiments, the agent may register with the operating system to receive events, for example, emitted by a filesystem driver, that indicate that files, such as executables or documents, are being accessed to identify those files or documents. These events may be the received request in some embodiments. Or in some cases, the native applications may include code that causes them to send a request to the agent for permission to launch.

Next, some embodiments may log the access request, as indicated by block 104, for example, in the above-described tamper-evident, immutable data repository. In some cases, the log entry may be sent over a network by the agent and may identify a user, a time, a geolocation, and application being accessed, a file being accessed, and other parameters pertaining to the request to launch the native application. In some embodiments, subsequent interactions with a native application may similarly be logged, for example, logging events in which files are written or in which files are opened.

Next, some embodiments may obtain an access credential from secure storage, as indicated by block 106. In some cases, the agent may retrieve the access credential from the above-describe tamper-evident, immutable data repository, though this approach may present problems for some users who require off-line access. In these scenarios, some embodiments may store the access credential for the native application on the client computing device in secure storage, for example in a secure sandbox (and such storage may be used when credentials are temporarily held). Some embodiments may encrypt the access credential in a ciphertext with an encryption key stored in or protected by encryption based on value stored in a secure element of the client computing device in some embodiments.

Some embodiments may attempt to authenticate the launch of the native application on behalf of the user associated with the access credential and determine whether the operation is successful, as indicated by block 108. Upon determining that the access credential is not valid, some embodiments may block the native application from launching, as indicated by block 110. In some cases, this may include logging the failed request in accordance with the operations of block 104, for example, including a logged event indicating that the request failed. Some embodiments may further present a user interface message indicating a reason why the application failed to launch.

Alternatively, upon successfully authenticating, some embodiments may proceed to execute the native application, as indicated by block 112. Some embodiments may then monitor for a de-authentication command, as indicated by block 114, and continue to execute the native application until such a de-authentication command is received or a user closes the native application. In some embodiments, access credentials may be associated with an expiration time, and some embodiments may check the operating native application against the expiration time and terminate the native application upon that time being exceeded and require network access to issue a new locally-stored authentication credential after the expiration time, for example, from the permission-management system.

In some embodiments, a de-authentication command may be received from the permission management system, for example, following operations described below. Some embodiments may then terminate the native application, as indicated by block 116 and remove the access credential from secure storage, as indicated by block 118. In some embodiments, the access credential may be removed by deleting a value or by overriding the value. Or in some cases, the access credential may be automatically deleted upon authenticating.

In some embodiments, the permission-management system, such as the permission-management system described above with reference to FIG. 1, may receive requests for a user interface from an administrator computing device, as indicated by block 120. In some cases, this may be a request for a web-based user interface, like that described below with reference to FIG. 6.

Some embodiments may then send the user interface to the administrator computing device, as indicated by block 122, and then later receive a request to manage permissions, as indicated by block 124. Some embodiments may determine whether it is a request to de-authenticate, as indicated by block 126. If the request is a request to de-authenticate the native application executing on the client computing device, some embodiments may proceed to block 128 and send a de-authentication command that engages the functionality following an affirmative determination at block 114 on the client computing device. In some cases the de-authentication command may be sent to the network socket identified to the permission management system upon launching of the agent in block 100.

Some embodiments may further log the de-authentication in the tamper-evident immutable data store, as indicated by block 130, and update permissions in the tamper-evident immutable data store, as indicated by block 132, for example, indicating that the corresponding user does not have permission to access the corresponding native application for which a de-authentication command was received.

Alternatively, upon determining that the request to manage permissions does not pertain to de-authentication, some embodiments may engage other functionality described below with reference to FIG. 5 and then return to block 120 to wait for the next request for a user interface from the administrator computing device.

Remotely Deauthenticating a User from a Web-Based Application Using a Centralized Login Server Some SaaS applications permit an administrator to adjust a user's credentials, e.g., canceling or changing permissions associated therewith. But in many cases, those systems do not terminate an ongoing session with the user. For instance, a user may remain logged in after being terminated for several hours, potentially leaking information or engaging in other malicious activity. To mitigate this, some existing systems force the user to log-out periodically, but such systems impose a high cognitive burden on users and interrupt legitimate sessions with the repeated request to re-authorize access.

Remotely deauthenticating a user from a web-based application using a centralized login server: As noted, administrative tools exist to change a user's password or disable a user account within web-based applications (or native application sessions). However, it is also the case that by changing the password, the user's current session may remain active until they explicitly log out or their authentication token expires (generally stored in cookies).

To mitigate these and other problems, some embodiments use continuously open connections from a user's browser to a centralized login server to command the client's browser to delete all cookies (authentication tokens) for a specific web domain. Also, in some embodiments, by executing this command, the client's browser will close all browser tabs and windows that are currently utilizing the specific web domain for which authentication privileges have been removed.

Many other centralized login systems (CASBs) lack the connectivity to the client's specific session to be able to exercise this level of control.

In some cases, this technique may be performed with a dual-browser approach like that described above. In some embodiments, the architecture is also used to prevent the user from accessing their logon credentials, but not all embodiments afford this benefit (e.g., the user may access and enter their credentials, while the present techniques are used to terminate access selectively).

Some embodiments include a system designed to be used by business employees where they are required to access web-based or native applications where credentials might otherwise need to be shared amongst multiple individuals within an organization. With some embodiments of this system, the user never has knowledge of their credentials and therefore cannot share them and furthermore allows the password to be much more complicated than a human would create, e.g., a random string longer than 32 bytes.

Figure 4:
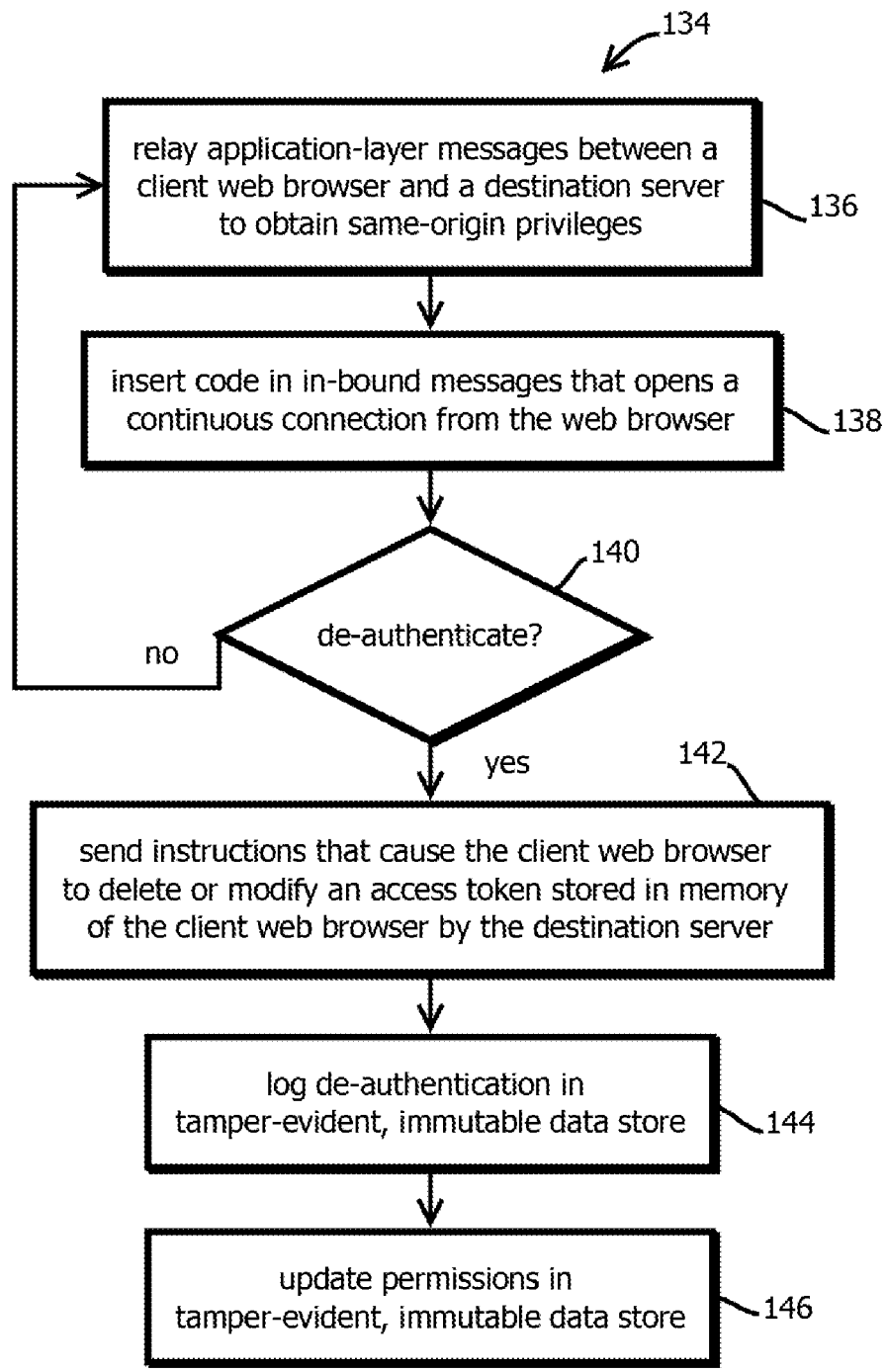
FIG. 4 is a flowchart that shows an example of a process by which an ongoing authenticated session between a client web browser and a third-party server may be terminated without waiting for the authentication token to expire in accordance with some embodiments of the present techniques.

FIG. 4 shows an example of a process 134 by which the above-functionality may be implemented. In some embodiments, the operations of the process 134 may be executed by the intermediary server described above with reference to FIG. 1, though embodiments are not limited to that implementation, which is not to suggest that any other description herein is limiting.

In some embodiments, the process 134 includes relaying application-layer messages between a client web browser and a destination server to obtain same-origin privileges on the client-web browser for content sent by the destination server, as indicated by block 136. In some cases, relaying application-layer messages may include modifying values in headers that identify an origin host by the intermediary server, such that both the client web browser and the destination server perceive the intermediary server as the remote computing device with which they are communicating.

Some embodiments may include inserting code in inbound messages that opens a continuous connection from the web browser on the client computing device, as indicated by block 138. In some embodiments, this may include inserting a JavaScript or WebAssembly routine that, when executed by a client web browser, establishes a websocket connection between a webpage on the client computing device and the intermediary server, such that the client computing device can receive messages from the intermediary server in real time, without waiting for the client computing device to pull the intermediary server. Or in some embodiments, such inserted code may cause the client computing device to periodically poll the intermediary server for control messages, such as de-authentication commands.

Some embodiments may then determine whether to de-authenticate an ongoing authenticated session between the client web browser and the destination server, as indicated by block 140. Upon determining not to de-authenticate, some embodiments may return to block 136 and continue relaying application-layer messages and inserting code is needed to maintain connections.

Figure 5:
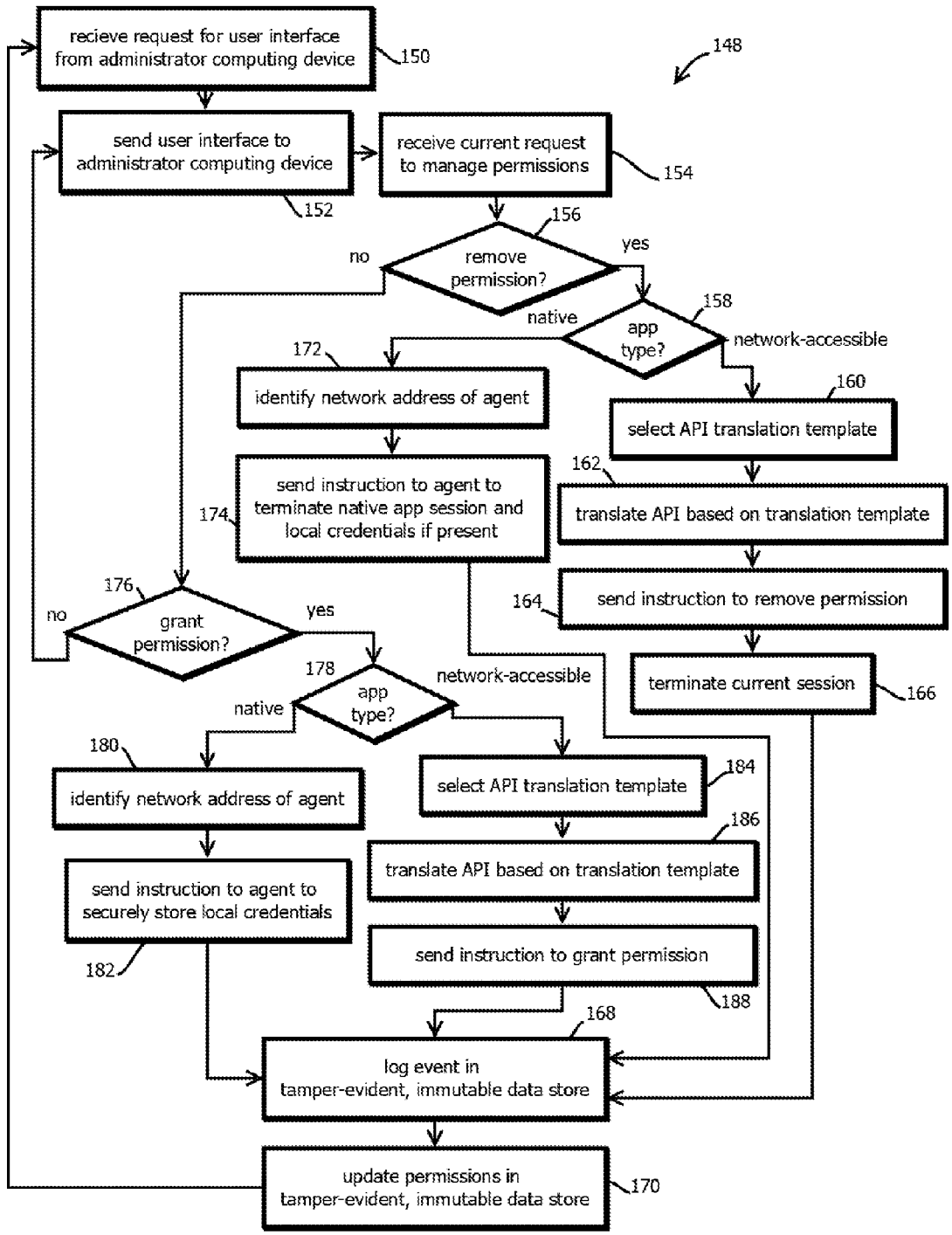
FIG. 5 is a flowchart that shows an example of a process by which a centralized permission management service may be provided in accordance with some embodiments of the present techniques.

Alternatively, upon determining to de-authenticate, for example, in response to receiving a de-authentication command via the process of FIG. 5, some embodiments may send instructions that cause the client web browser to delete or modify an access token stored in memory of the client web browser by the destination server, as indicated by block 142. In cases in which an agent is installed on the client computing device, some embodiments may further send instructions to the agent that causes the agent to close a client web browser tab or client web browser instance. In some embodiments, the sent instructions may be sent via an open websocket connection. In some embodiments, the inserted code in block 138 may be formed based on application-specific records that indicate addresses in web browser memory where authentication tokens are stored, and the inserted code in some cases may include code that, responsive to the sent instructions, deletes or otherwise overwrites or renders in operative the stored authentication token at the identified address, such as in an identifed cookie, localStorage object, or SQLite database entry.

Some embodiments may then log the de-authentication in the tamper-evident, immutable data store, as indicated by block 144, and update permissions in the tamper-evident immutable data store, as indicated by block 146.

Thus, some embodiments executing the process 134 may terminate an active session in which a user is having an authenticated authorized exchange with a third-party destination server, without waiting for an authentication token to expire, and in some cases without requiring an agent be installed on the client computing device Centralized Access Management of Web-Based or Native To manage user access, organizations often employ permissioning systems. However, such systems are often very complex and require specific training on their operation. Additionally, these permissioning systems are often disparate, with no centralized location for management. Finally, changes to a user's or user group's permissions are often not recorded in a centralized, persistent, immutable data store, which could lend itself to tampering or other misuse. (None of which is to suggest that systems exhibiting various subsets of these problems are disclaimed, or that any other subject matter is disclaimed.) In some cases, permission management may extend upon related techniques described in U.S. patent application Ser. No. 15/171,347, titled COMPUTER SECURITY AND USAGE-ANALYSIS SYSTEM, the contents of which are incorporated by reference.

FIG. 5 shows an example of a process 148 by which the above-described and other techniques may be implemented. In some embodiments, the process 148 may be executed by the above-described permission-management application to provide a centralized login management service that is operative to control both native applications (e.g., thick client applications, or monolithic non-networked applications) and hosted applications access with a thin client by user computing devices. Further, and some cases the process 148 may cause access events and updates to permissions to be logged in various tamper-evident, immutable data stores that tend to deter threat actors from engaging in malicious manipulation of access credentials due to near certainty of being discovered.

In some embodiments, the process 148 may include receiving a request for a user interface from the administrator computing device, as indicated by block 150, for example, a request for web content from a user computing device web browser. Some embodiments may respond by sending a user interface to the administrator computing device 152, for instance, by sending a user interface like that described below with reference to FIG. 6. Some embodiments may then receive a current request to manage permissions, as indicated by block 154, from the administrator computing device, for instance, upon a user clicking on, touching, dragging and dropping, or otherwise selecting various inputs in the user interface associated with corresponding event handlers in program code of the sent user interface that cause the client computing device to send the request that specifies how to permissions are to be managed.

Some embodiments may determine whether the request is a request to remove a permission, as indicated by block 154, such as a request to remove a permission for a particular type of application for a particular group of users or users in a particular role, which in some cases may be specified by the request and, in some cases, may correspond to records in the above-described repositories. Upon determining that the request is a request to remove a permission, some embodiments may determine an application type associated with the request as indicated in block 158. Upon determining that the application type is a network-accessible application, such as a SaaS application hosted by a third party and accessed with a thin client, such as a web browser, on user computing devices, some embodiments may proceed to block 160. Some embodiments may then select an application program interface translation template, for instance, in accordance with the techniques described above, and translate an application program interface request based on the translation template, as indicated by block 162. In some embodiments, the received request to manage permission may be in a unified schema specifying a unified format by which an administer computing device may communicate requests to manage permissions that are effective to manage a heterogeneous mix of native applications and network accessible applications each having different application program interfaces. The translation operational block 162 may include identifying fields in the template where values specified in the request are to be inserted, and inserting those values to form a valid application program interface request to the network-accessible application specified in the requite class to manage permissions.

Some embodiments may then send the instructions to remove permissions, as indicated by block 164, for instance, sending the application program interface request to a third-party web server using the translated application program interface request, e.g., to a destination server 16 described with reference to FIG. 1. Some embodiments may further engage the process of FIG. 4 above to terminate a current session between an identified user computing device are identified user and the network-accessible application identified in the request to manage permissions, as indicated by block 166. Some embodiments may also engage the process of FIG. 3 to close a web browser instance.

In some embodiments, this, and each of the other changes to permissions described herein, may be logged as an event in a tamper-evident, immutable data store, as indicated by block 168, and some embodiments may update permissions in the tamper-evident immutable data store, as indicated by block 170 to reflect the request to manage permissions. In some embodiments, the updated permission may serve as the authoritative record of permissions granted to a user.

The term "immutable" in the phrase "immutable data structure" refers to an arrangement of data that the computing system and write the right command is configured to leave in place even after the information represented by the data changes. For example, the data might represent a user's telephone number, and embodiments using an immutable data structure may write a new record indicating a new telephone number, rather than overwrite an existing record. Thus, both the older version and the newer version are preserved (and may be labeled as the older or newer version) even after the value changes. Such embodiments may then reference a most recent representation of the value for that field to effectuate the change, rather than deleting the old instance.

In some embodiments, the immutable data structure may be a tamper-evident data structure that is computationally infeasible to modify without the modification being detectable to a party auditing the data structure. Some embodiments may implement cryptographic hash pointers described below in a directed acyclic graph that make it computationally infeasible for a party to modify stored data without those modifications being evident in virtue of inconsistent hash values elsewhere in the data structure. Computational feasibility may depend on the use case, for example, whether economics and time available provide for certain amounts of competing resources to be brought to bear. In many cases, an operation requiring more than 10^128 hashes on average to manufacture a collision with altered data may be said to be computationally infeasible.

Some embodiments may then return to block 150 and wait for the next request for a user interface.

Alternatively, in block 158, upon determining that the application type is a native application, some embodiments may proceed to identify a network address of the agent, indicated by block 172, of the computing device in which a specified instance of the native application corresponding to the request to manage permissions is configured to execute, for instance, where the executable is stored. Some embodiments may then send instructions to the agent to terminate the native application session and local credentials if present, as indicated by block 174. In some embodiments, these operations may include the operations described above with reference to FIG. 3. In some cases, the client computing device at issue may be off-line, and embodiments may maintain an inventory of tasks that is interrogated upon being contacted by an agent. Upon detecting a task corresponding to the agent, embodiments may then send a message that instructs the agent to take the specified action.

Some embodiments may then proceed to log the event and update permissions, as indicated by block 168 and 170 and described above, before returning the block 150.

Alternatively, upon determining in block 156 that the request does not pertain to removing permissions, some embodiments may proceed to block 176, and determine whether the request pertains to granting permissions. Upon determining that the request does not pertain to granting permissions, some embodiments may address other operation specified in the request, or send a user interface to the administrator computing device indicating an invalid request and presenting an opportunity for the user to submit a modified request manage permissions.

Alternatively, upon determining that the request is to grant permissions, some embodiments may proceed to determine an application type of the request, as indicated by block 178.

Upon determining that the application type is a network-accessible application, some embodiments may proceed to block 184 and select an application program interface translation template. In some cases, this may include operations like those described above with reference to block 160 and may be followed by translating an incoming unified application program interface request into an application-program interface request in accordance with the schema of the network-accessible application, as indicated by block 186, for example, applying techniques like those described above with reference to block 162. Next, some embodiments may send instructions to a destination server implementing the network-accessible application, or controlling access for the network-accessible application, and those instructions may cause the network-accessible application to update a user account to grant the permission, as indicated by block 188.

Some embodiments may then proceed to log the event and update permissions, as indicated by block 168 and 170 and described above, before returning the block 150.

Alternatively, in block 178, upon determining that the application type is a native application, some embodiments may identify a network address of an agent associated with a user for whom permission is to be granted for a network at a native application, as indicated by block 180. Some embodiments may then send instructions to the agent to securely store credentials to facilitate off-line access in the secure local storage, as described above, as indicated by block 182. Or in some cases, the credentials may be stored exclusively remotely from the client computing device, for example in the tamper-evident, immutable data store.

Some embodiments may then proceed to log the event and update permissions, as indicated by block 168 and 170 and described above, before returning the block 150.

Thus, some embodiments may provide a unified interface by which a heterogeneous set of native applications and a heterogeneous set of network-accessible applications exposing various different application program interface schemas, may be managed, for instance, via a unified user interface by which requests to manage permissions are input, formed, and sent. Further, embodiments may log corresponding events and permissions in tamper-evident, immutable data stores, such as blockchains, in some cases like those described below with reference to FIG. 7, thereby determining threat actors from attempting to compromise these records.

Figure 6:
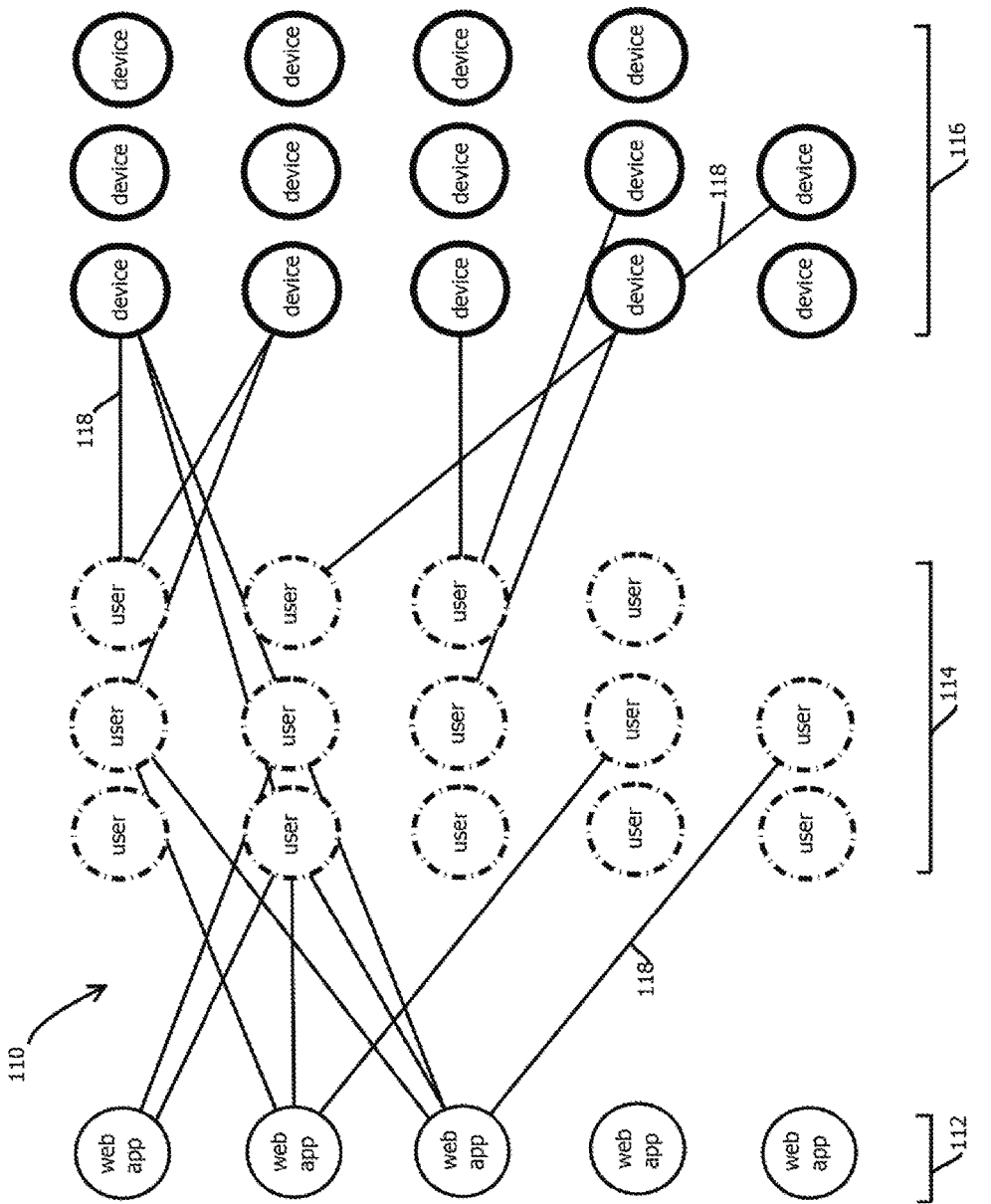
FIG. 6 is an example of a centralized user interface by which user permissions may be managed for heterogenous applications in accordance with some embodiments of the present techniques.

FIG. 6 shows an example of a drag-and-drop user interface 110 by which users may enter request to manage permissions. The user interface of FIG. 6 may be that sent in the operation of block 152, and may send the request received in operation in block 154. In some embodiments, a column of circular icons 112 may each represent a different cloud services web application, circular icons in columns 114 may each represent users, and a set of columns of circular icons 116 may each represent computing devices or groups thereof. Some embodiments may further support icons representing groups of users. Permissions may be modified by adding, deleting, or changing attributes of edges 118 indicating respective pairs of these entities to which permissions defined apply.

Figure 7:
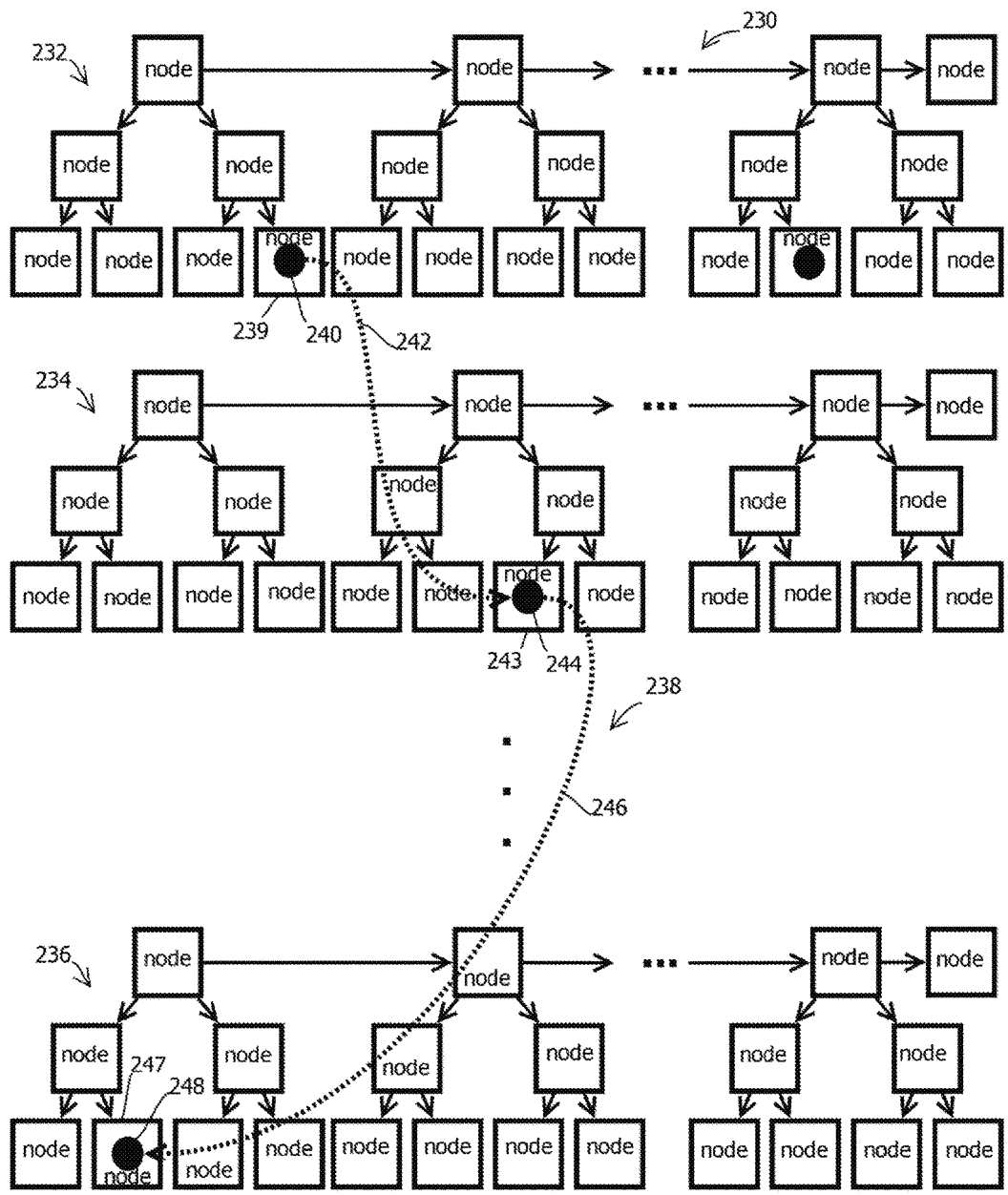
FIG. 7 shows an example of a tamper-evident, immutable data repository in which records may be stored in accordance with some embodiments of the present techniques.

FIG. 7 shows an example of a resulting data structure 230 in which a plurality of segments are stored in different directed acyclic graphs 232, 234, and 236, which in some cases may each have the features of the directed acyclic graphs described with reference to FIG. 3 in the patent application titled IMMUTABLE DATASTORE FOR LOW-LATENCY READING AND WRITING OF LARGE DATA SETS, filed on the same day as this application, the contents of which are hereby incorporated by reference. In some embodiments, credentials, log entries, and records mapping permissions to users may be segmented, and the segments of a given value may be stored in a content graph overlaid on each of these directed acyclic graphs 232, 234, and 326, which may be characterized as a verification graphs to distinguish an overlaid content graph (and as they serve as an immutable tamper-evident log of the values of the segments in some embodiments).

In this example, the segments in the content graph 238 form a linked list, with a first node of the segment content graph 238 being stored in a leaf node 239 of verification graph 232, that first segment being designated as node 240 in the content graph. The node 240 in the content graph may be stored as an attribute in node content in the node 238 of the verification graph, and the content node 240 may include a pointer 242 to a next node in the content graph 238, which may be stored on a different verification graph 234. In some cases, the pointer 242 may be characterized as an edge in the content graph 238 and may be expressed as an identifier of a node 243 in the verification graph 234 or in some cases as an identifier of an attribute in that node where multiple segments are stored in different attributes of a given node of a verification graph. In some embodiments, in the content graph 238, node 240 points to another segment 244, which may then the point to another segment with pointer 246 in verification node 247 of verification graph 236. Verification node 247 may include as node content one or more attributes that specify a final segment in content graph 238 designated with element number 248. In some cases, node 148 may specify that there are no additional nodes in the value.

As a result, even if a given malicious actor somehow compromises one of the verification graphs 232, 234, or 236, that attacker will only be able to access a set of segments of values and will not have access to other segments needed to complete the full value. Further, because the segments are stored in a tamper-evident directed acyclic graph with the above-described hash point cryptographic hash pointers serving as edges/pointers, evidence of tampering will not be computationally feasible to conceal.

Thus, FIG. 7 shows a plurality of verification directed acyclic graphs 232, 234, and 236, each of which may be replicated, and each of which has nodes that may store as node content data that encodes a content graph 238, which in this case is a linked list of segments, where each segment in sequence points to the next segment and its corresponding address, and in some cases attribute identifier in the underlying verification graphs.

In this example, segments are arranged in a one-dimensional linked list, but embodiments are consistent with other arrangements of content graphs. For example, some segments may include pointers to multiple subsequent segments, for example, in a skip list to facilitate concurrent retrieval, and in some cases segments may be stored in association with a segment position identifier, for example, an order in which the segments are to be sequenced to reconstitute the segmented value in a read operation. In another example, segments in a content graph encoding a plurality of segments of an individual value may be stored in a binary tree content graph, a skip list content graph, or a combination of binary trees, linked lists, skip lists, and the like.

Three segments for a given value are shown, but embodiments are expected to include substantially more in some cases. In some cases, binary data encoding a single text character may be segmented, for example with a given Unicode character being segmented into two or more segments, and a given value yielding 10 or more or 20 or more segments, which in some cases may each be stored in different distributed acyclic graphs, which in some cases may each be replicated multiple times, for example 3 or more times. Thus, a given value may be stored in part on 30 different storage compute nodes. In some cases, different instances may be compared to determine an authoritative copy, e.g., selecting a stored and returned value according to a majority rule approach among the replicated instances. In some cases, e.g., where the replicated instances of the graphs are on permissioned computing devices, embodiments may vote for a given value without performing a proof of work or proof of storage operation, or where devices storing the graphs are untrusted, some embodiments may determine consensus with a proof of work, storage, or stake, e.g., according to a consensus protocol, like Paxos, Raft, or the like. In some embodiments, e.g., in untrusted systems, instances may be addressed according to Interplanetary File System (IPFS) or with various distributed hash table approaches.

In the example of FIG. 7, each of the directed acyclic graphs 232, 234, and 236 is the same type of directed acyclic graph, in this case a linked list of binary trees, where edges are formed by cryptographic hash pointers. In other embodiments, a heterogeneous set of directed acyclic graphs may be combined, for example with different segments stored in different types of graphs. For example, an initial segment may be stored in a binary tree, while other segments may be stored in directed acyclic graphs like those shown in FIG. 7, for example, in linked lists of binary trees.

Cryptographic hash pointers may be based upon a cryptographic hash function which may take a plurality of inputs, such as one or more node attributes and produce an output of fixed size. These functions may have pre-image resistance, second pre-image resistance, and collision resistance. Examples include an SHA-256, BLAKE, BLAKE2, SHA-1, SHA-2, and SHA-3 hash function. In some embodiments, the cryptographic hash function may be a one way function in which a given string of input produces deterministically a string of output that is relatively difficult or impossible to reverse to determine the input from the output while being relatively easy to confirm that an input corresponds to the output. For example, it may be computationally infeasible to identify a hash collision in which different instances of the input produce a given output. In some embodiments, the cryptographic hash function may implement the Merkle-Damgård construction.

In some embodiments, each binary tree in FIG. 7 may be characterized as a block (in a linked list of blocks) with a root node. In some embodiments, each of the arrows between blocks in the binary trees may also be cryptographic hash pointers, for example, based on an identifier of the node to which the cryptographic hash pointer points and a cryptographic hash value based upon node content of that node, which may include an attribute of that node that is itself a cryptographic hash value of another hash pointer. Thus, in some cases, a cryptographic hash value of a root node may be based upon node content of every node of the binary tree. In some embodiments, a root node may include three such cryptographic hash pointers, corresponding to six node attributes, the six attributes including three pairs of node identifiers and cryptographic hash values based on node content of those nodes. In some embodiments, node content may further include a cryptographic hash value based upon each of these values, or such a cryptographic hash value may be stored in another node that points to that node. The illustrated graphs are acyclic. As that term is used herein, it may refer to an acyclic subset of a larger cyclic graph. Thus, claims to acyclic directed graphs may not be avoided simply by adding an un-used cycle.

In some embodiments, the cryptographic hash function may be based upon a compression function that accepts a fixed size input and produces a fixed sized output with a one-way compression function. In some embodiments, because the input to the cryptographic hash function may be a variety of different sizes, the transformation may be performed in a variety of iteration and a plurality of iterations. Some embodiments may determine a length of input, such as a number of bytes, accepted by the one-way compression function, a length of output of the one-way compression function and determine a difference between these two lengths. Some embodiments may then parse an input to the cryptographic hash function into sequences of a size of this difference and iteratively input the parsed sequence into the one-way compression function and then combine the output of that iteration with a next portion parsed portion from the input, for example, incrementing from a beginning to an end of an input and iteratively concatenating, for example, prepending or appending or otherwise intermingling the output of the previous iteration of the one-way compression function with a next parsed portion of the input to the cryptographic hash function. Some embodiments may repeat this until an end of the input to the cryptographic hash function is reached (e.g., reaching a point within some threshold number of bytes or the last byte). In some embodiments, for example, where a plurality of inputs are applied, some embodiments may combine these inputs in a variety of approaches, for example prepending or appending or otherwise intermingling these inputs to form a string upon which these operations may be performed to produce a fixed sized output that is based upon the entirety of the input.

Figure 8:
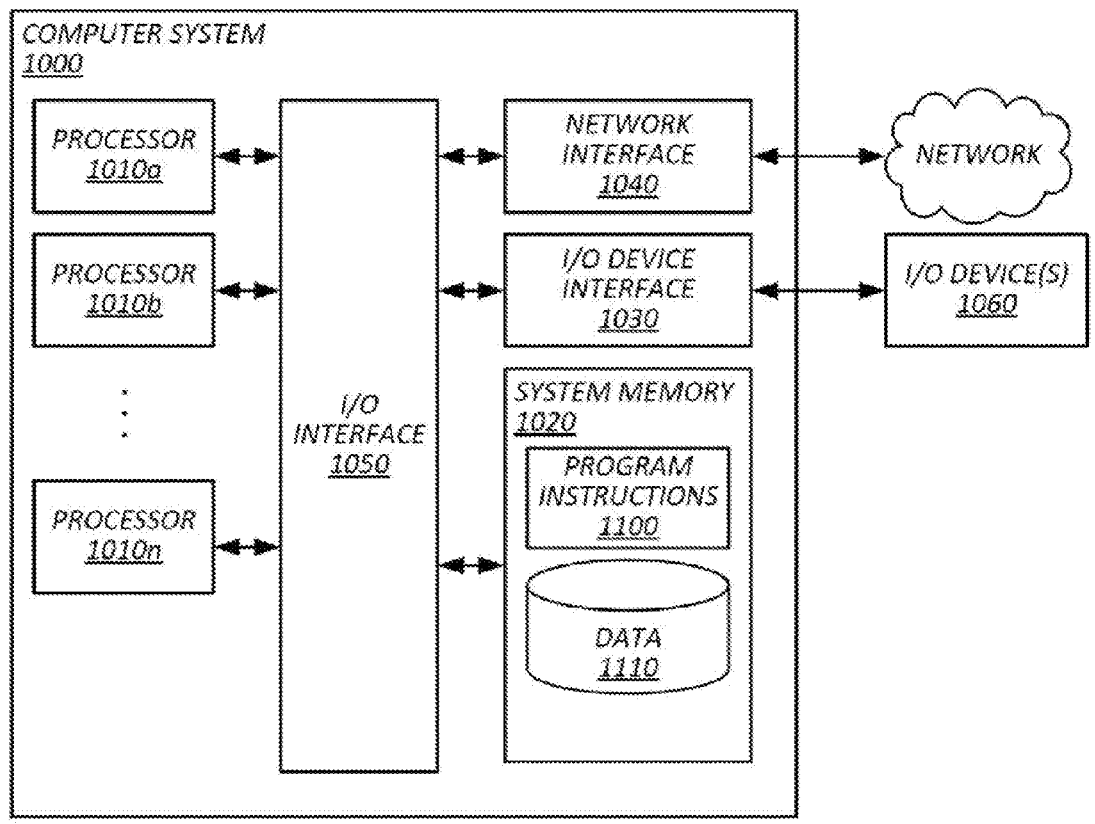
FIG. 8 shows an example of a computing device by which the present techniques may be implemented.

FIG. 8 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A tangible, non-transitory, machine-readable medium storing instructions that when executed by one or more processors effectuate operations comprising: relaying, with a server at a first domain, at least part of a plurality application-layer messages between a client web browser executing on a client computing device and one or more destination servers at a second domain, wherein: at least some of the destination servers host content by which a user accesses resources via the client web browser; inbound messages, among the plurality of messages, include content by which a user interface is rendered in a web page on the client web browser; memory of the client web browser stores an access token provided by at least one of the destination servers; outbound messages, among the plurality of messages, include requests for content to at least some of the destination servers from the client web browser executing on the client computing device; at least some of the outbound messages include a value that demonstrates possession of the access token to at least some of the destination servers; and the first domain is defined by an identifier of an application-layer protocol, an identifier of a network host, and an identifier of a port of the server with which the server at the first domain communicates with the client web browser; determining, with one or more processors, to terminate subsequent authenticated access by the client web browser to at least some of the one or more destination servers; sending, from the server at the first domain, after the client web browser obtains the access token, instructions that cause the client web browser to delete or modify the access token stored in memory of the client web browser such that the access token ceases to be effective to demonstrate that the client web browser is authenticated to at least some of the one or more destination servers, wherein: the client web browser implements a same origin policy that prohibits content from one domain from modifying values stored in browser memory by content from another domain; and the access token is obtained from at least some of the one or more destination servers after authenticating the client web browser to at least some of the one or more destination servers.

2. The medium of embodiment 1, wherein: the access token is deleted before the access token expires; the value that demonstrates possession of the access token is the access token; and the one or more destination servers include servers hosting a software-as-a-service application.

3. The medium of any one of embodiments 1-2 wherein the operations comprise: after determining to terminate subsequent authenticated access by the client web browser, sending instructions to the client computing device that cause the client computing device to close an instance of the client web browser or a tab of an instance of the client web browser.

4. The medium of any one of embodiments 1-3, wherein relaying at least part of a plurality application-layer messages comprises: receiving a given one of the inbound messages from a given one of the one or more destination servers, the given one of the inbound messages having a transport-protocol header that identifies the second domain in an origin host field; forming a version of the given inbound message in which the first domain is identified in the origin host field instead of the second domain; and sending the version of the given inbound message in which the first domain is identified in the origin host field to the client web browser.

5. The medium of embodiment 4, wherein: the first domain is designated in the given one of the inbound messages by a first uniform resource identifier; and the second domain is designated in the version of the given inbound message in which the first domain is identified in the origin host field by a second uniform resource identifier, the second uniform resource identifier being a different uniform resource identifier from the first uniform resource identifier.

6. The medium of any one of embodiments 1-5, wherein relaying the messages comprises: sending at least some of the one or more destination servers a value that demonstrates possession of an authentication credential without making the value that demonstrates possession of an authentication credential available to the client web browser; receiving, from at least some of the one or more destination servers, the authentication token after sending the value that demonstrates possession of an authentication credential; and sending, from the first domain, to the client web browser instructions to store the access token in a cookie in the client web browser memory.

7. The medium of any one of embodiments 1-6, wherein: the client computing device is configured to use a private domain name service to obtain an Internet Protocol address of the one or more destination servers; the operations comprise changing a mapping of the domain name service for the second domain to match an Internet Protocol address of the server at the first domain.

8. The medium of any one of embodiments 1-7, wherein the operations comprise: steps for circumventing the same origin policy to de-authenticate a web browser.

9. The medium of any one of embodiments 1-8, wherein the operations comprise: after determining to terminate subsequent authenticated access by the client web browser, sending from the first domain to the client web browser instructions that, when executed, cause the client web browser to obfuscate rendered content by deleting or modifying content of a document object model or virtual document object model previously rendered by the client computing device.

10. The medium of any one of embodiments 1-9, wherein the operations comprise: maintaining a continuously open connection from the client web browser to the server at the first domain; and after determining to terminate subsequent authenticated access by the client web browser, sending, via the open connection, instructions to the client computing device that cause the client web browser to delete all cookies for a designated domain.

11. The medium of embodiment 10, wherein the operations comprise: mirroring state of the client web browser with a headless web browser executed by the server at the first domain.

12. The medium of any one of embodiments 1-11, wherein: relaying all application-layer messages between the client web browser executing on the client computing device and all destination servers accessed by the client web browser on the Internet.

13. The medium of any one of embodiments 1-12, wherein the operations comprise: sending, from the server at the first domain, to at least one of the destination servers, a message that causes the at least one of the destination servers to terminate an authenticated session with the client web browser.

14. The medium of any one of embodiments 1-13, wherein: relaying messages comprise augmenting content from the one or more destination servers to add scripting instructions to monitor, at the client web browser, for the instructions that cause the client web browser to delete or modify the access token stored in memory of the client web browser.

15. The medium of embodiment 14, wherein: monitoring comprises creating a websocket connection with the server at the first domain.

16. The medium of any one of embodiments 1-14, wherein the instructions that cause the client web browser to delete or modify the access token stored in memory of the client web browser cause the client web browser to delete the access token.

17. The medium of any one of embodiments 1-16, wherein the operations comprise: segmenting the access credential into a plurality of segments; and storing the plurality of segments in different tamper-evident, immutable directed acyclic graphs having edges defined by cryptographic hash pointers with cryptographic hash values based on at least some of the segments.

18. The medium of any one of embodiments 1-17, wherein: the operations comprise: logging data documenting access requests by the client web browser into a tamper-evident, immutable directed acyclic graph having edges defined by cryptographic hash pointers with cryptographic hash values based the data documenting access requests.

19. The medium of any one of embodiments 1-18, wherein the operations comprise: providing an identity management system.

20. A method, comprising: the operations of any one of embodiments 1-19.

21. A system, comprising: one or more processors; and memory storing instructions that when executed by the processors cause the processors to effectuate operations comprising: the operations of any one of embodiments 1-19.

What is claimed is:

1. A tangible, non-transitory, machine-readable medium storing instructions that when executed by one or more processors effectuate operations comprising:
  relaying, with a server at a first domain, at least part of a plurality application-layer messages between a client web browser executing on a client computing device and one or more destination servers at a second domain, wherein:

at least some of the destination servers host content by which a user accesses resources via the client web browser;

inbound messages, among the plurality of messages, include content by which a user interface is rendered in a web page on the client web browser;

memory of the client web browser stores an access token provided by at least one of the destination servers;

outbound messages, among the plurality of messages, include requests for content to at least some of the destination servers from the client web browser executing on the client computing device;

at least some of the outbound messages include a value that demonstrates possession of the access token to at least some of the destination servers; and the first domain is defined by an identifier of an application-layer protocol, an identifier of a network host, and an identifier of a port of the server with which the server at the first domain communicates with the client web browser;

determining, with one or more processors, to terminate subsequent authenticated access by the client web browser to at least some of the one or more destination servers;

sending, from the server at the first domain, after the client web browser obtains the access token, instructions that cause the client web browser to delete or modify the access token stored in memory of the client web browser such that the access token ceases to be effective to demonstrate that the client web browser is authenticated to at least some of the one or more destination servers, wherein:

the client web browser implements a same origin policy that prohibits content from one domain from modifying values stored in browser memory by content from another domain; and the access token is obtained from at least some of the one or more destination servers after authenticating the client web browser to at least some of the one or more destination servers, wherein:

relaying at least part of a plurality application-layer messages comprises:

receiving a given one of the inbound messages from a given one of the one or more destination servers, the given one of the inbound messages having a transport-protocol header that identifies the second domain in an origin host field;

forming a version of the given inbound message in which the first domain is identified in the origin host field instead of the second domain; and sending the version of the given inbound message in which the first domain is identified in the origin host field to the client web browser;

the first domain is designated in the given one of the inbound messages by a first uniform resource identifier;

the second domain is designated in the version of the given inbound message in which the first domain is identified in the origin host field by a second uniform resource identifier, the second uniform resource identifier being a different uniform resource identifier from the first uniform resource identifier;

relaying the messages comprises:

sending at least some of the one or more destination servers a value that demonstrates possession of an authentication credential without making the value that demonstrates possession of an authentication credential available to the client web browser;

receiving, from at least some of the one or more destination servers, the authentication token after sending the value that demonstrates possession of an authentication credential; and sending, from the first domain, to the client web browser instructions to store the access token in a cookie in the client web browser memory;

the client computing device is configured to use a private domain name service to obtain an Internet Protocol address of the one or more destination servers;

the operations comprise changing a mapping of the domain name service for the second domain to match an Internet Protocol address of the server at the first domain; and relaying messages comprises augmenting content from the one or more destination servers to add scripting instructions to monitor, at the client web browser, for the instructions that cause the client web browser to delete or modify the access token stored in memory of the client web browser.

2. The medium of claim 1, wherein:

the access token is deleted before the access token expires;

the value that demonstrates possession of the access token is the access token; and the one or more destination servers include servers hosting a software-as-a-service application.

3. The medium of claim 1 wherein the operations comprise:

after determining to terminate subsequent authenticated access by the client web browser, sending instructions to the client computing device that cause the client computing device to close an instance of the client web browser or a tab of an instance of the client web browser.

4. The medium of claim 1, wherein the operations comprise:

steps for circumventing the same origin policy to de-authenticate a web browser.

5. The medium of claim 1, wherein the operations comprise:

after determining to terminate subsequent authenticated access by the client web browser, sending from the first domain to the client web browser instructions that, when executed, cause the client web browser to obfuscate rendered content by deleting or modifying content of a document object model or virtual document object model previously rendered by the client computing device.

6. The medium of claim 1, wherein the operations comprise:

maintaining a continuously open connection from the client web browser to the server at the first domain; and after determining to terminate subsequent authenticated access by the client web browser, sending, via the open connection, instructions to the client computing device that cause the client web browser to delete all cookies for a designated domain.

7. The medium of claim 6, wherein the operations comprise:

mirroring state of the client web browser with a headless web browser executed by the server at the first domain.

8. The medium of claim 1, wherein:
relaying all application-layer messages between the client web browser executing on the client computing device and all destination servers accessed by the client web browser on the Internet.

9. The medium of claim 1, wherein the operations comprise:
sending, from the server at the first domain, to at least one of the destination servers, a message that causes the at least one of the destination servers to terminate an authenticated session with the client web browser.

10. The medium of claim 1, wherein:
monitoring comprises creating a websocket connection with the server at the first domain.

11. The medium of claim 1, wherein the instructions that cause the client web browser to delete or modify the access token stored in memory of the client web browser cause the client web browser to delete the access token.

12. The medium of claim 1, wherein the operations comprise:
segmenting the access credential into a plurality of segments; and
storing the plurality of segments in different tamper-evident, immutable directed acyclic graphs having edges defined by cryptographic hash pointers with cryptographic hash values based on at least some of the segments.

13. The medium of claim 1, wherein the operations comprise:
logging data documenting access requests by the client web browser into a tamper-evident, immutable directed acyclic graph having edges defined by cryptographic hash pointers with cryptographic hash values based the data documenting access requests.

14. The medium of claim 1, wherein the operations comprise:
providing an identity management system.

15. A method, comprising:
relaying, with a server at a first domain, at least part of a plurality application-layer messages between a client web browser executing on a client computing device and one or more destination servers at a second domain, wherein:
at least some of the destination servers host content by which a user accesses resources via the client web browser;
inbound messages, among the plurality of messages, include content by which a user interface is rendered in a web page on the client web browser;
memory of the client web browser stores an access token provided by at least one of the destination servers;
outbound messages, among the plurality of messages, include requests for content to at least some of the destination servers from the client web browser executing on the client computing device;
at least some of the outbound messages include a value that demonstrates possession of the access token to at least some of the destination servers; and
the first domain is defined by an identifier of an application-layer protocol, an identifier of a network host, and an identifier of a port of the server with which the server at the first domain communicates with the client web browser;
determining, with one or more processors, to terminate subsequent authenticated access by the client web browser to at least some of the one or more destination servers;
sending, from the server at the first domain, after the client web browser obtains the access token, instructions that cause the client web browser to delete or modify the access token stored in memory of the client web browser such that the access token ceases to be effective to demonstrate that the client web browser is authenticated to at least some of the one or more destination servers, wherein:
the client web browser implements a same origin policy that prohibits content from one domain from modifying values stored in browser memory by content from another domain; and
the access token is obtained from at least some of the one or more destination servers after authenticating the client web browser to at least some of the one or more destination servers,
wherein:
relaying at least part of a plurality application-layer messages comprises:
receiving a given one of the inbound messages from a given one of the one or more destination servers, the given one of the inbound messages having a transport-protocol header that identifies the second domain in an origin host field;
forming a version of the given inbound message in which the first domain is identified in the origin host field instead of the second domain; and
sending the version of the given inbound message in which the first domain is identified in the origin host field to the client web browser;
the first domain is designated in the given one of the inbound messages by a first uniform resource identifier;
the second domain is designated in the version of the given inbound message in which the first domain is identified in the origin host field by a second uniform resource identifier, the second uniform resource identifier being a different uniform resource identifier from the first uniform resource identifier;
relaying the messages comprises:
sending at least some of the one or more destination servers a value that demonstrates possession of an authentication credential without making the value that demonstrates possession of an authentication credential available to the client web browser;
receiving, from at least some of the one or more destination servers, the authentication token after sending the value that demonstrates possession of an authentication credential; and
sending, from the first domain, to the client web browser instructions to store the access token in a cookie in the client web browser memory;
the client computing device is configured to use a private domain name service to obtain an Internet Protocol address of the one or more destination servers;
the operations comprise changing a mapping of the domain name service for the second domain to match an Internet Protocol address of the server at the first domain; and
relaying messages comprises augmenting content from the one or more destination servers to add scripting instructions to monitor, at the client web browser, for the instructions that cause the client web browser to delete or modify the access token stored in memory of the client web browser.

16. The method of claim 15, wherein:
the access token is deleted before the access token expires;
the value that demonstrates possession of the access token is the access token; and
the one or more destination servers include servers hosting a software-as-a-service application.

17. The method of claim 15, comprising:
after determining to terminate subsequent authenticated access by the client web browser, sending instructions to the client computing device that cause the client computing device to close an instance of the client web browser or a tab of an instance of the client web browser.

18. The method of claim 15, comprising:
steps for circumventing the same origin policy to de-authenticate a web browser.

19. The method of claim 15, comprising:
after determining to terminate subsequent authenticated access by the client web browser, sending from the first domain to the client web browser instructions that, when executed, cause the client web browser to obfuscate rendered content by deleting or modifying content of a document object model or virtual document object model previously rendered by the client computing device.

20. The method of claim 15, comprising:
maintaining a continuously open connection from the client web browser to the server at the first domain; and
after determining to terminate subsequent authenticated access by the client web browser, sending, via the open connection, instructions to the client computing device that cause the client web browser to delete all cookies for a designated domain.

21. The method of claim 20, comprising:
mirroring state of the client web browser with a headless web browser executed by the server at the first domain.

22. The method of claim 15, wherein:
relaying all application-layer messages between the client web browser executing on the client computing device and all destination servers accessed by the client web browser on the Internet.

23. The method of claim 15, comprising:
sending, from the server at the first domain, to at least one of the destination servers, a message that causes the at least one of the destination servers to terminate an authenticated session with the client web browser.

24. The method of claim 15, wherein:
monitoring comprises creating a websocket connection with the server at the first domain.

25. The method of claim 15, wherein the instructions that cause the client web browser to delete or modify the access token stored in memory of the client web browser cause the client web browser to delete the access token.

26. The method of claim 15, wherein the operations comprise:
segmenting the access credential into a plurality of segments; and
storing the plurality of segments in different tamper-evident, immutable directed acyclic graphs having edges defined by cryptographic hash pointers with cryptographic hash values based on at least some of the segments.

27. The method of claim 15, comprising:
logging data documenting access requests by the client web browser into a tamper-evident, immutable directed acyclic graph having edges defined by cryptographic hash pointers with cryptographic hash values based the data documenting access requests.

28. The method of claim 15, comprising:
providing an identity management system.

* * * * *